Feb. 25, 1964 N. HOGLUND 3,122,239
APPARATUS FOR FORMING CONTOURS
Original Filed Aug. 20, 1957 27 Sheets-Sheet 1

INVENTOR.
NILS HOGLUND
BY
William A. Zalesak
ATTORNEY

INVENTOR.
NILS HOGLUND

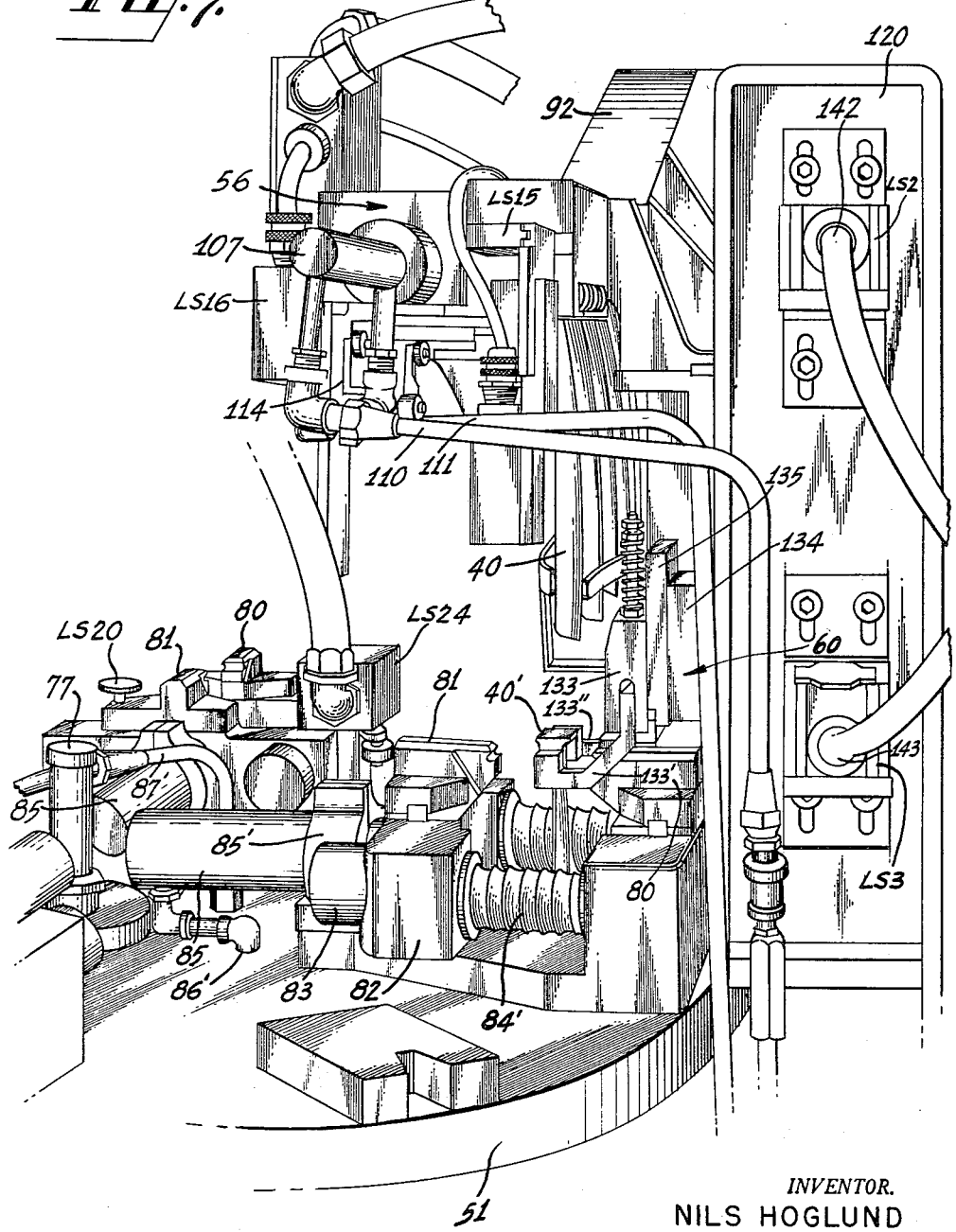

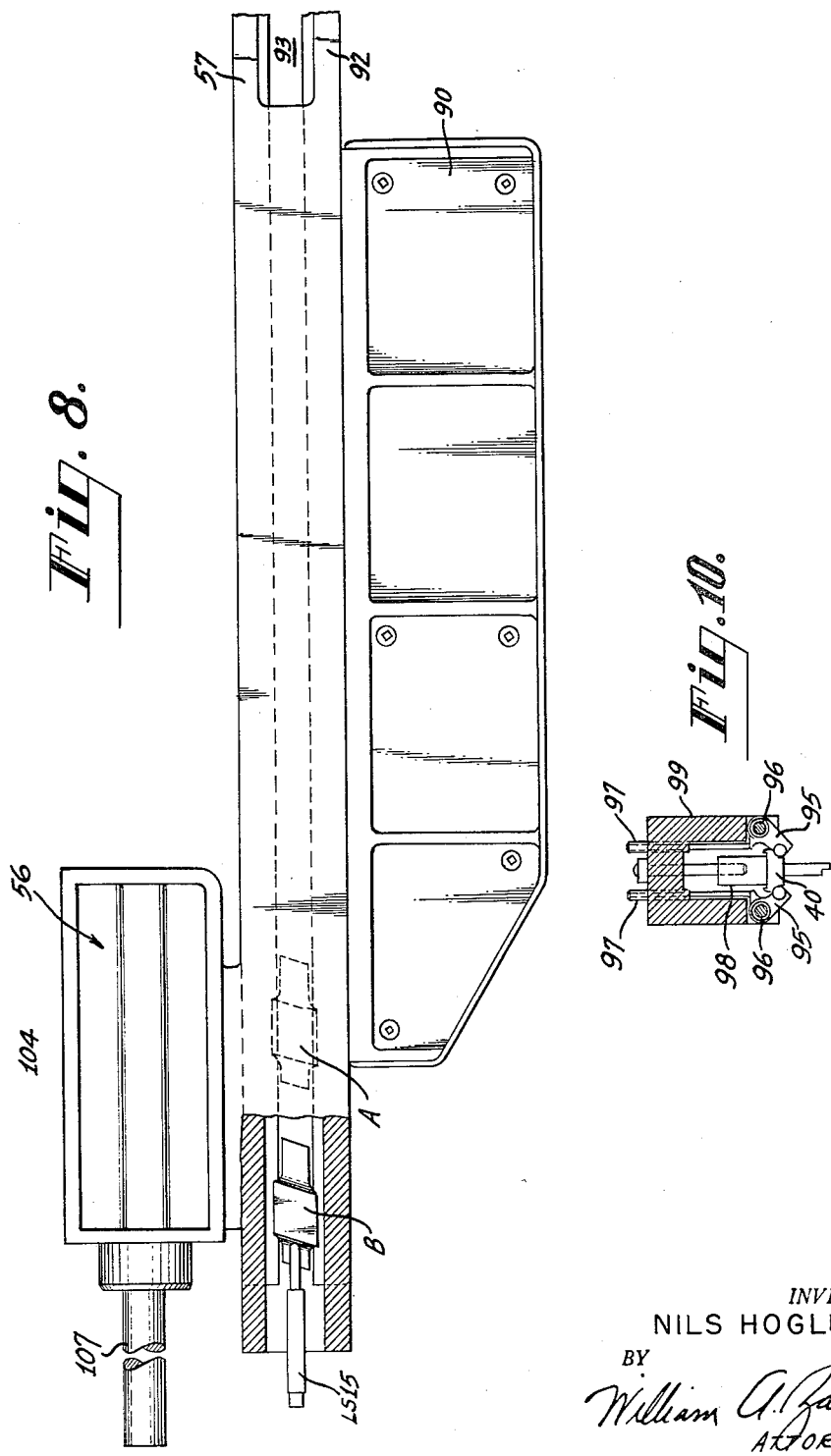

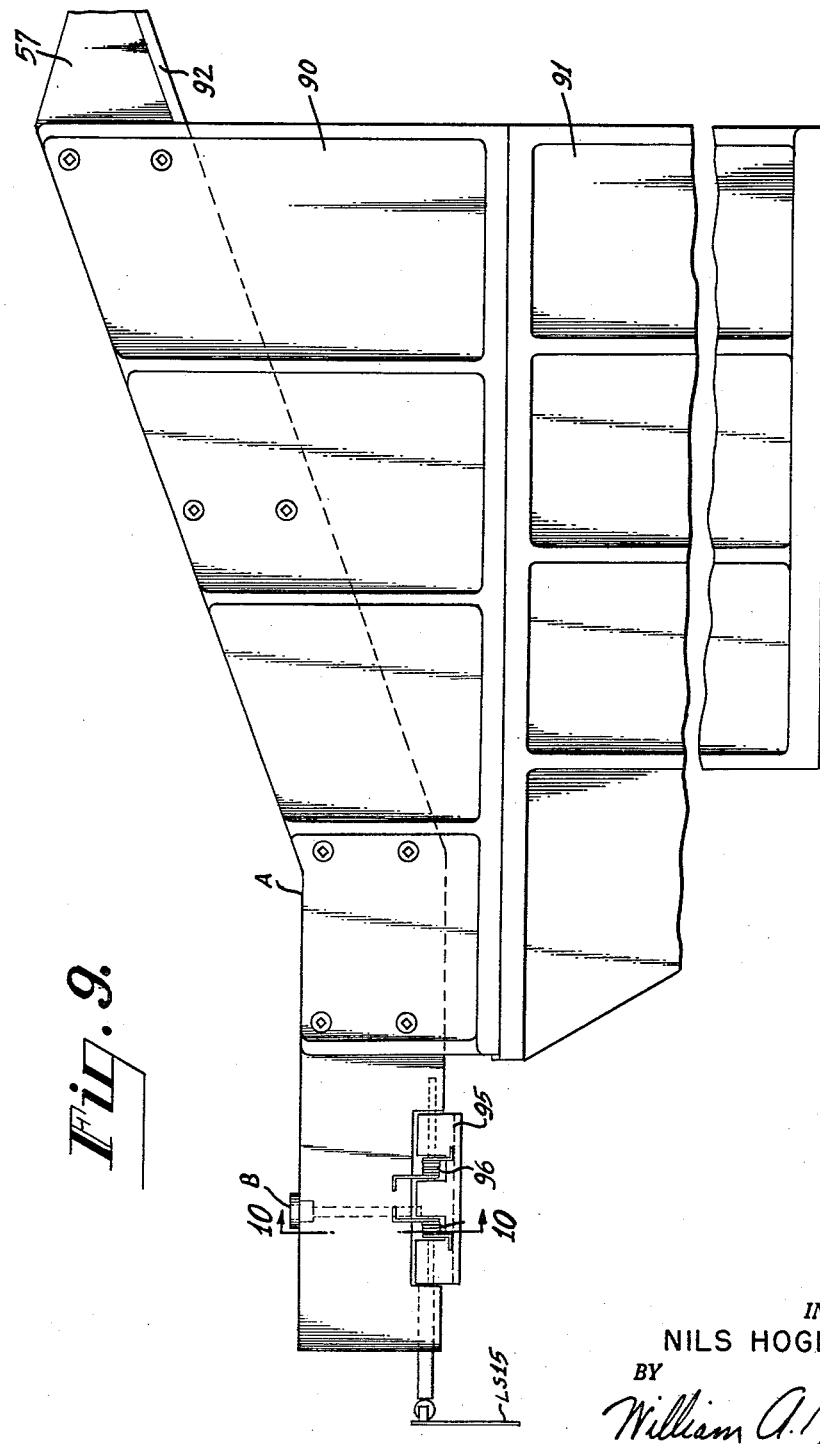

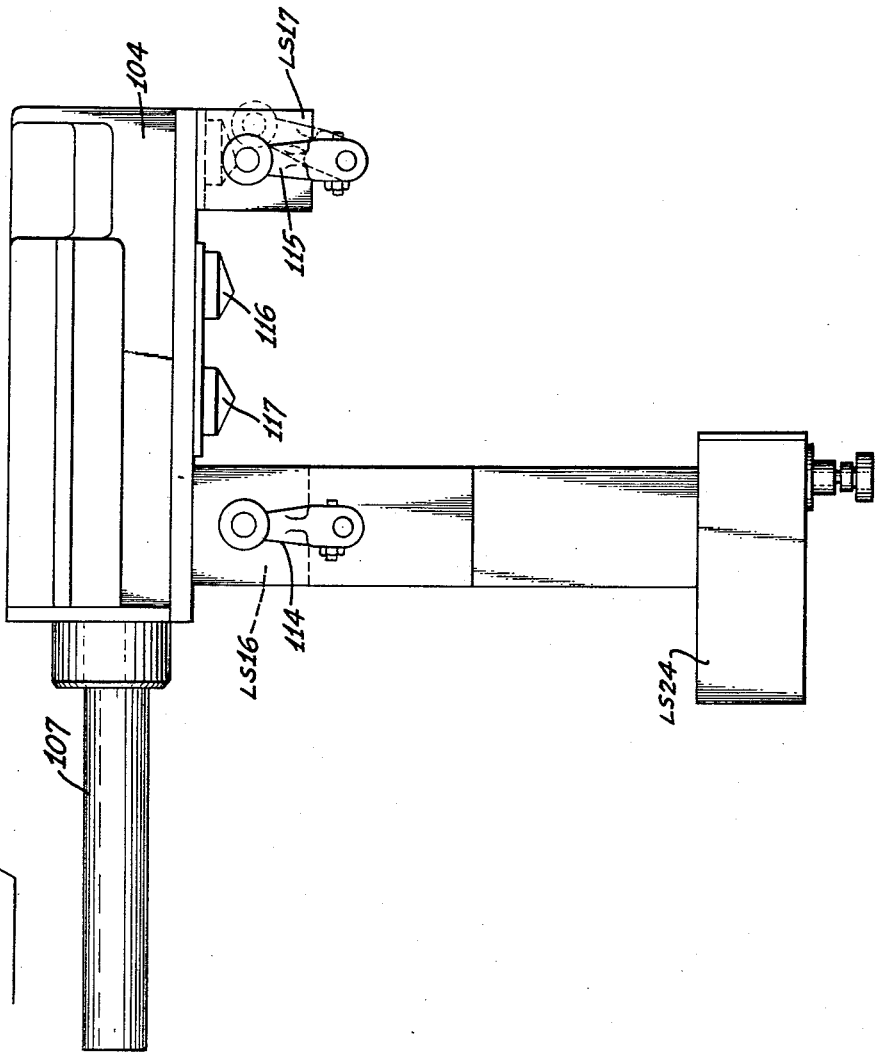

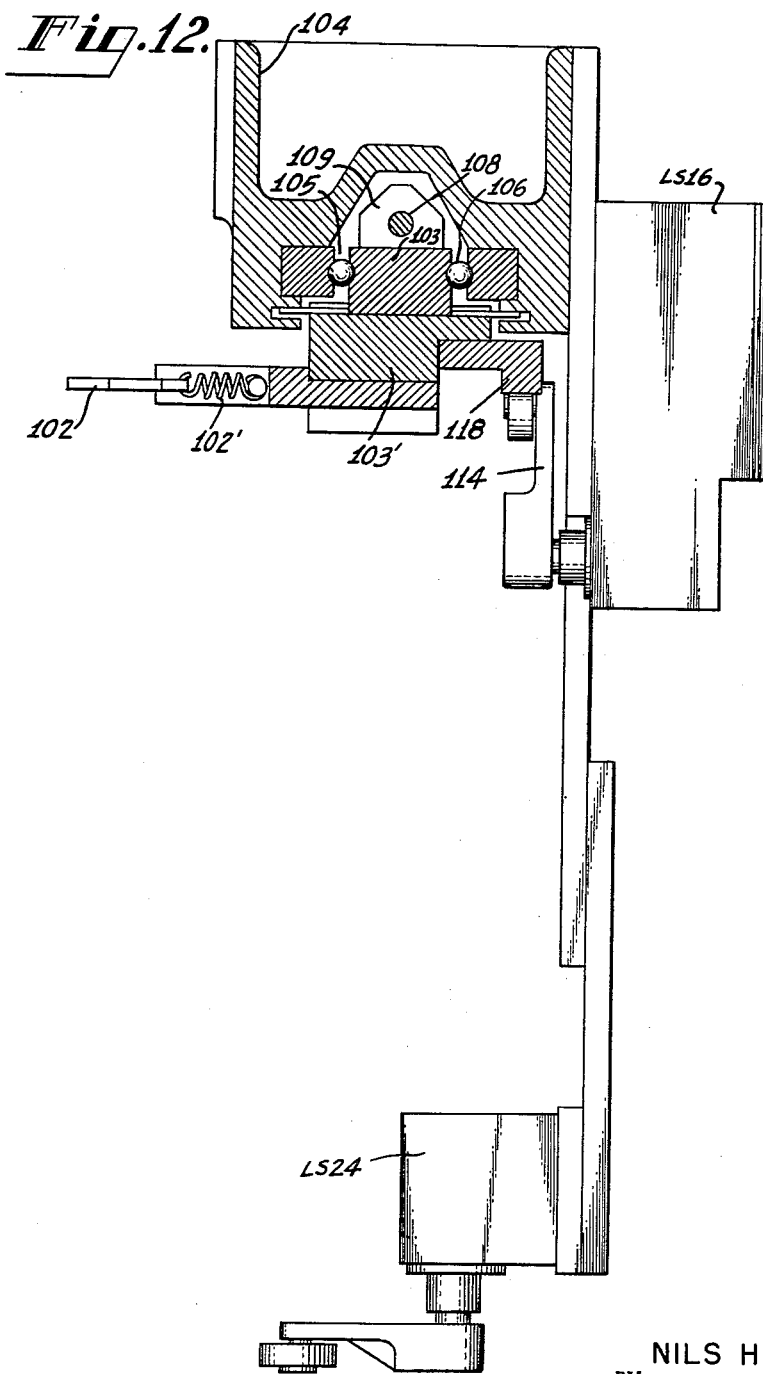

Feb. 25, 1964     N. HOGLUND     3,122,239
APPARATUS FOR FORMING CONTOURS
Original Filed Aug. 20, 1957     27 Sheets-Sheet 12
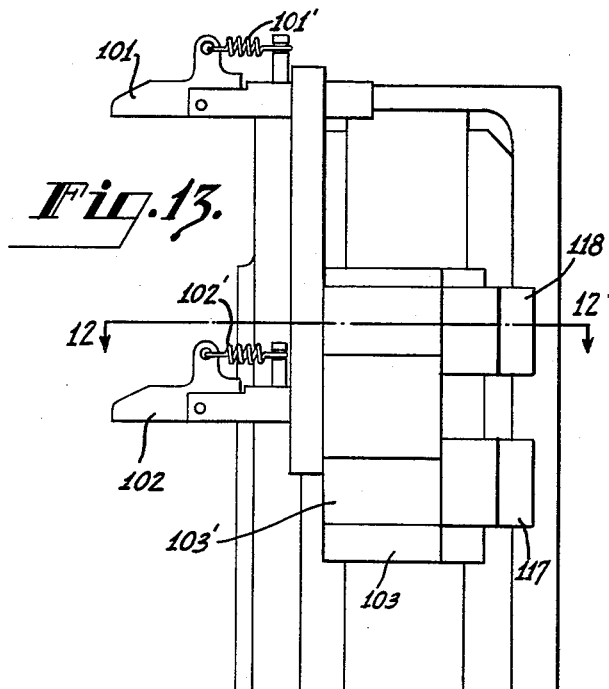
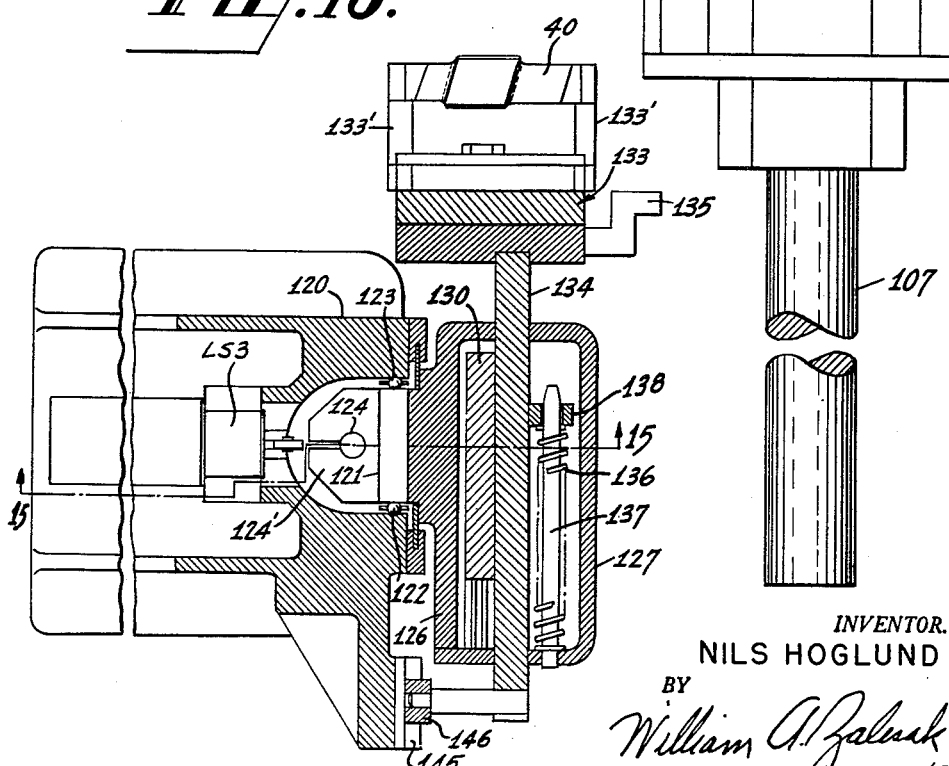
INVENTOR.
NILS HOGLUND Feb. 25, 1964   N. HOGLUND   3,122,239
APPARATUS FOR FORMING CONTOURS
Original Filed Aug. 20, 1957   27 Sheets-Sheet 13

INVENTOR.
NILS HOGLUND
BY
William A. Zalesak
ATTORNEY

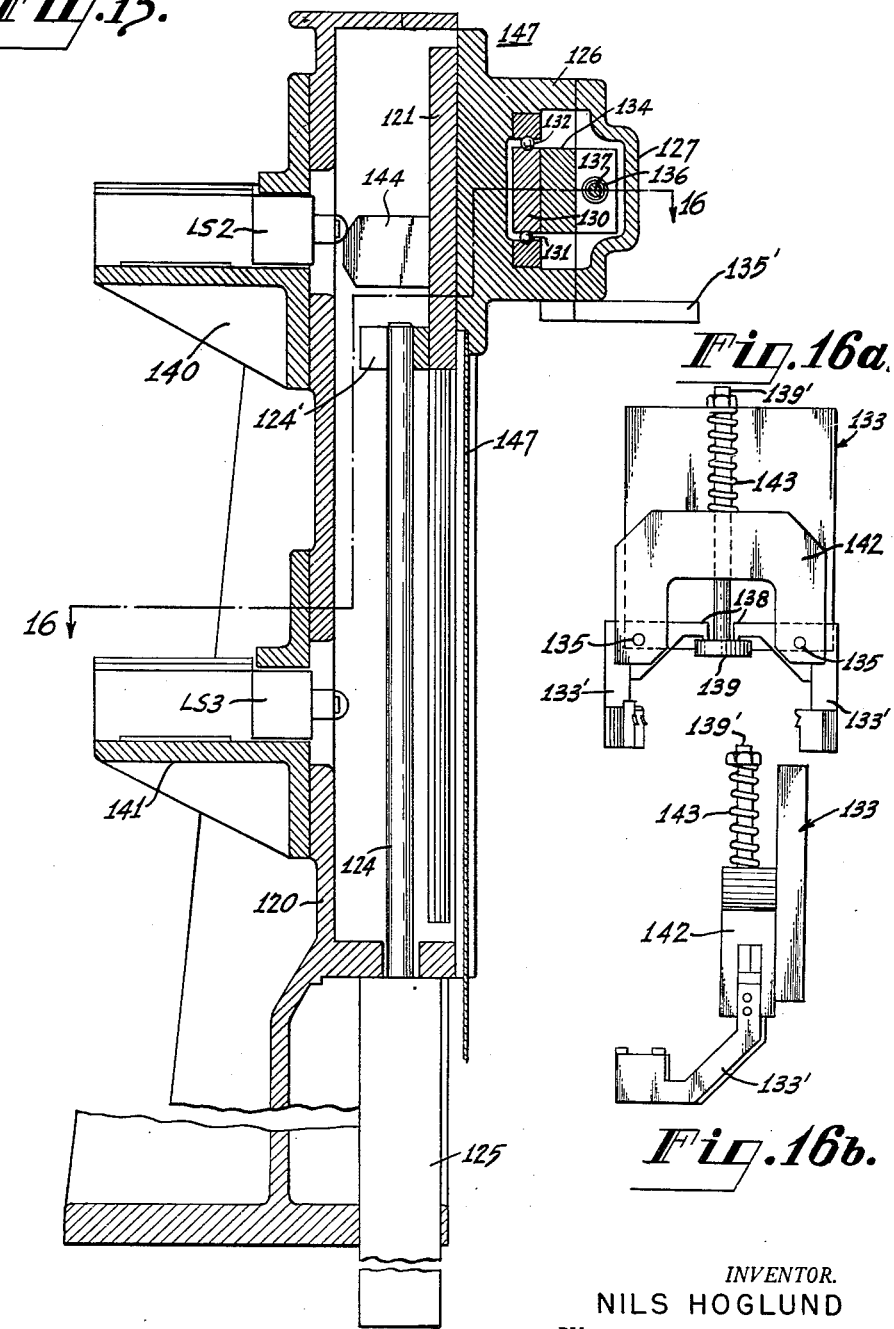

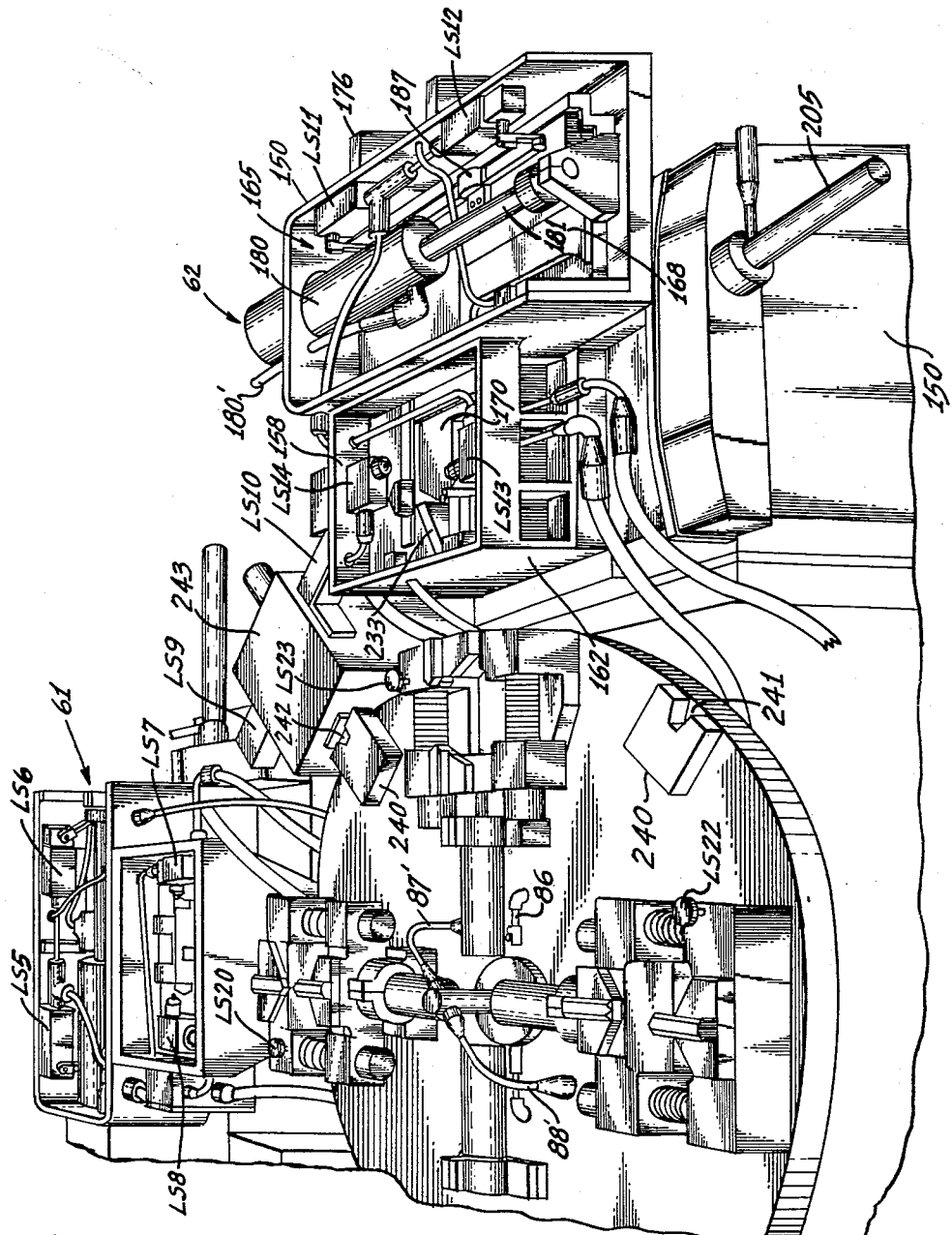

Feb. 25, 1964  N. HOGLUND  3,122,239
APPARATUS FOR FORMING CONTOURS
Original Filed Aug. 20, 1957  27 Sheets-Sheet 17

INVENTOR.
NILS HOGLUND
BY
William A. Zalesak
ATTORNEY

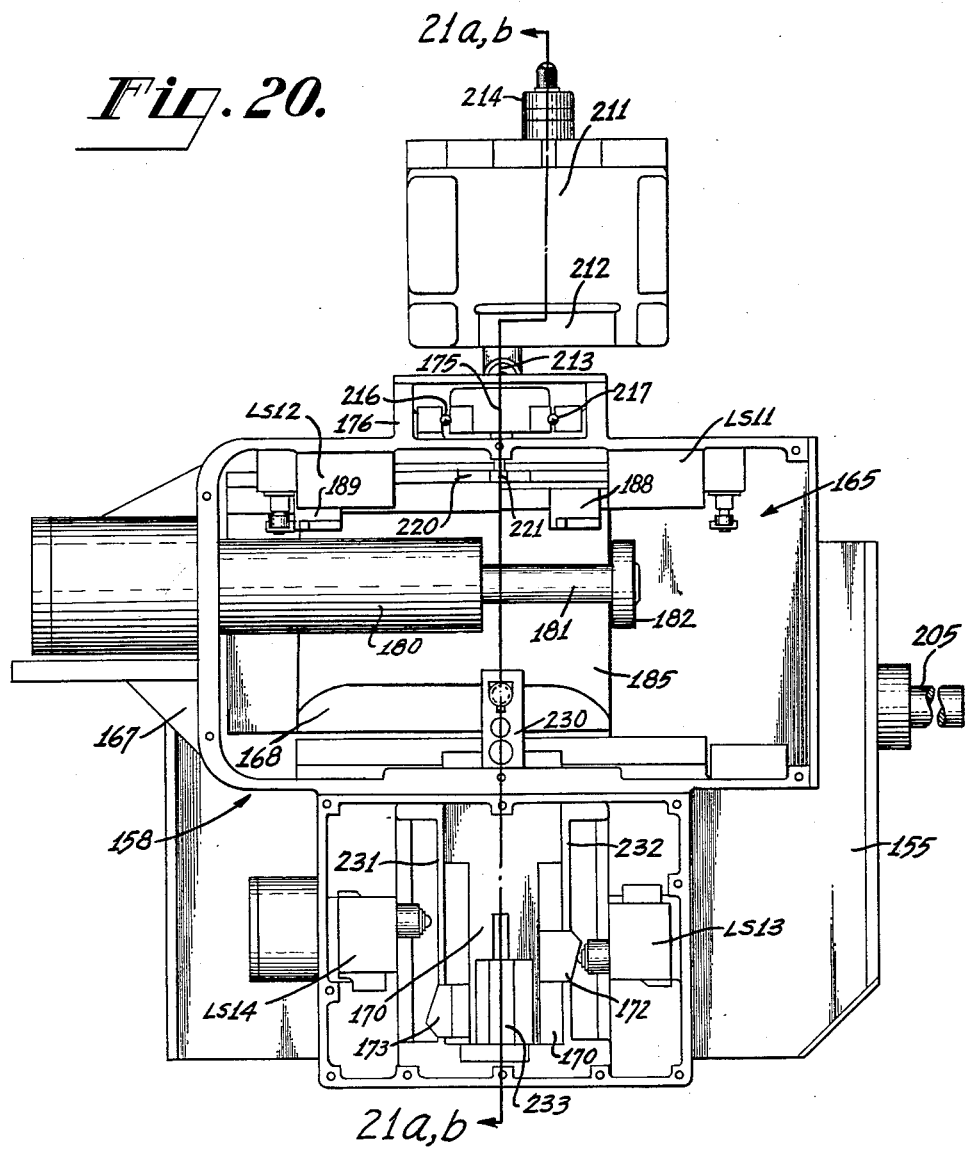

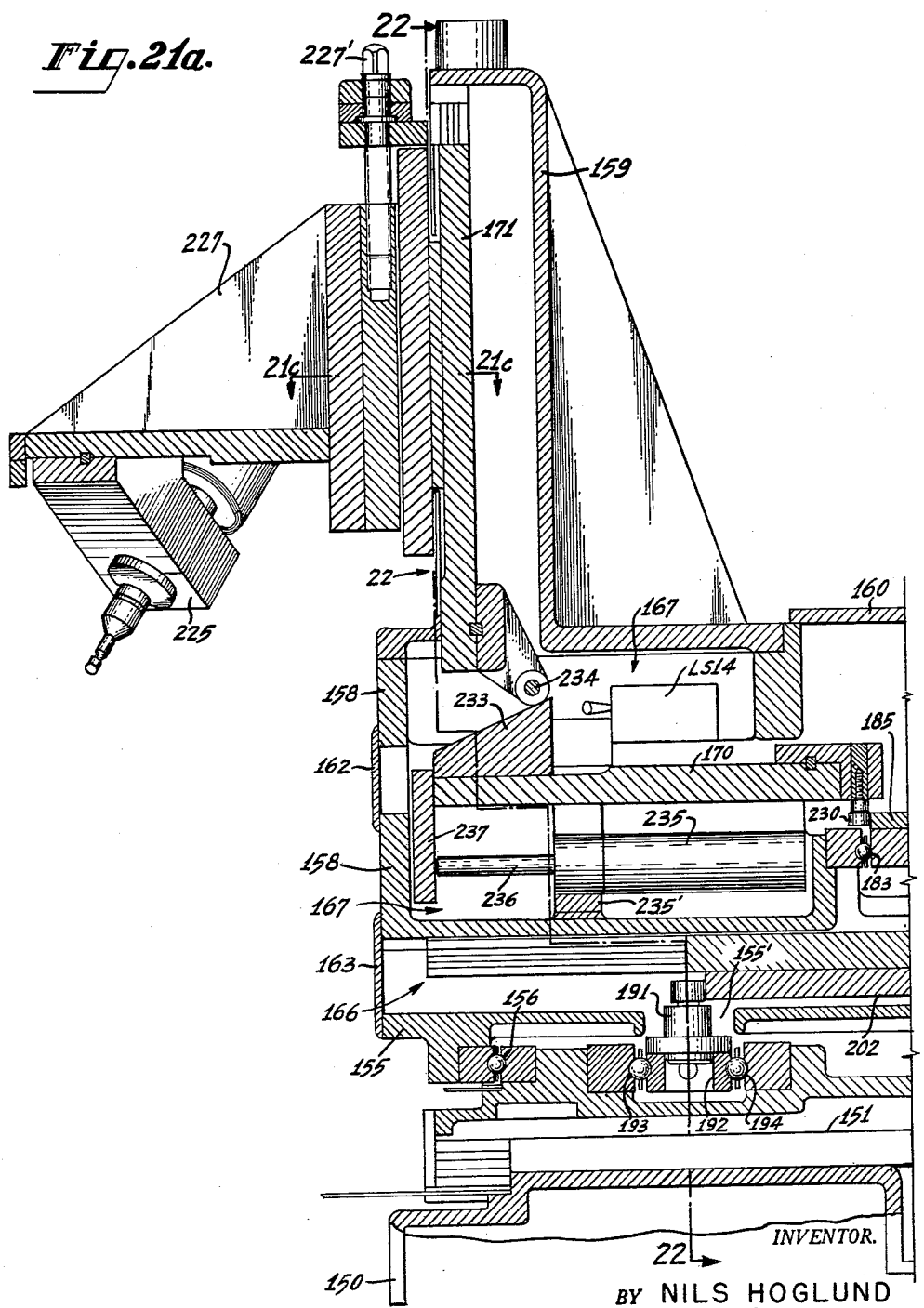

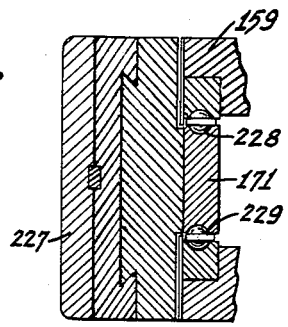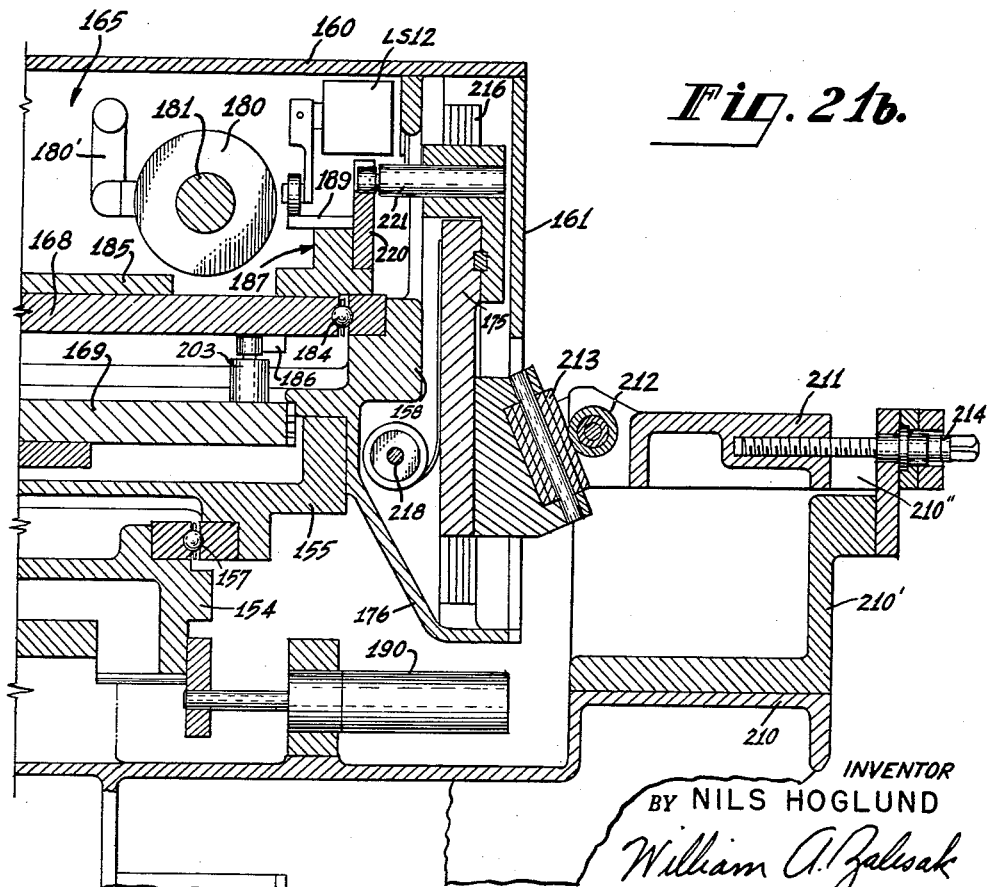

Feb. 25, 1964    N. HOGLUND    3,122,239
APPARATUS FOR FORMING CONTOURS
Original Filed Aug. 20, 1957    27 Sheets-Sheet 21

INVENTOR.
NILS HOGLUND
BY
William A. Zaluak
ATTORNEY

Feb. 25, 1964 N. HOGLUND 3,122,239
APPARATUS FOR FORMING CONTOURS
Original Filed Aug. 20, 1957 27 Sheets-Sheet 23

INVENTOR.
NILS HOGLUND
BY
William A. Balesak
ATTORNEY

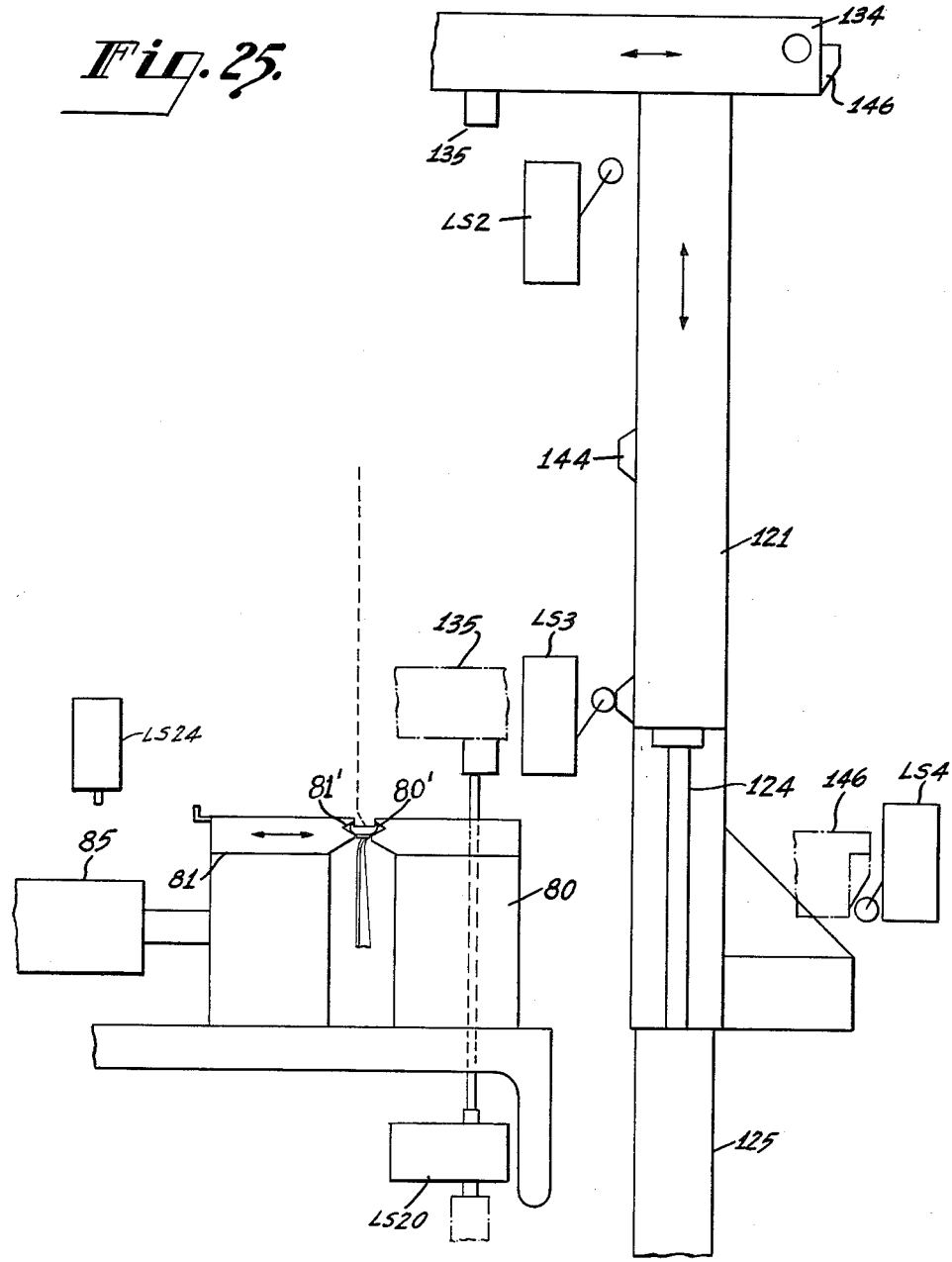

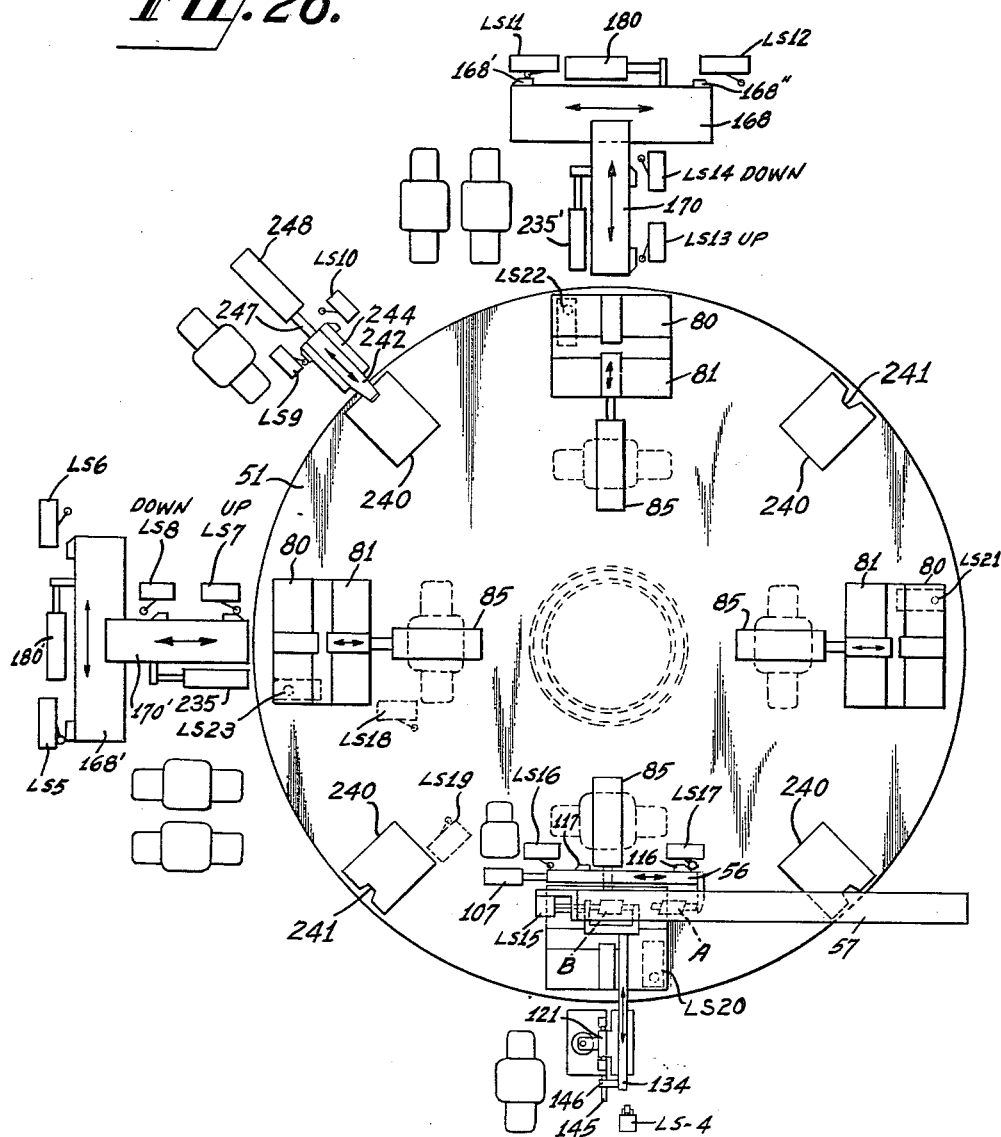

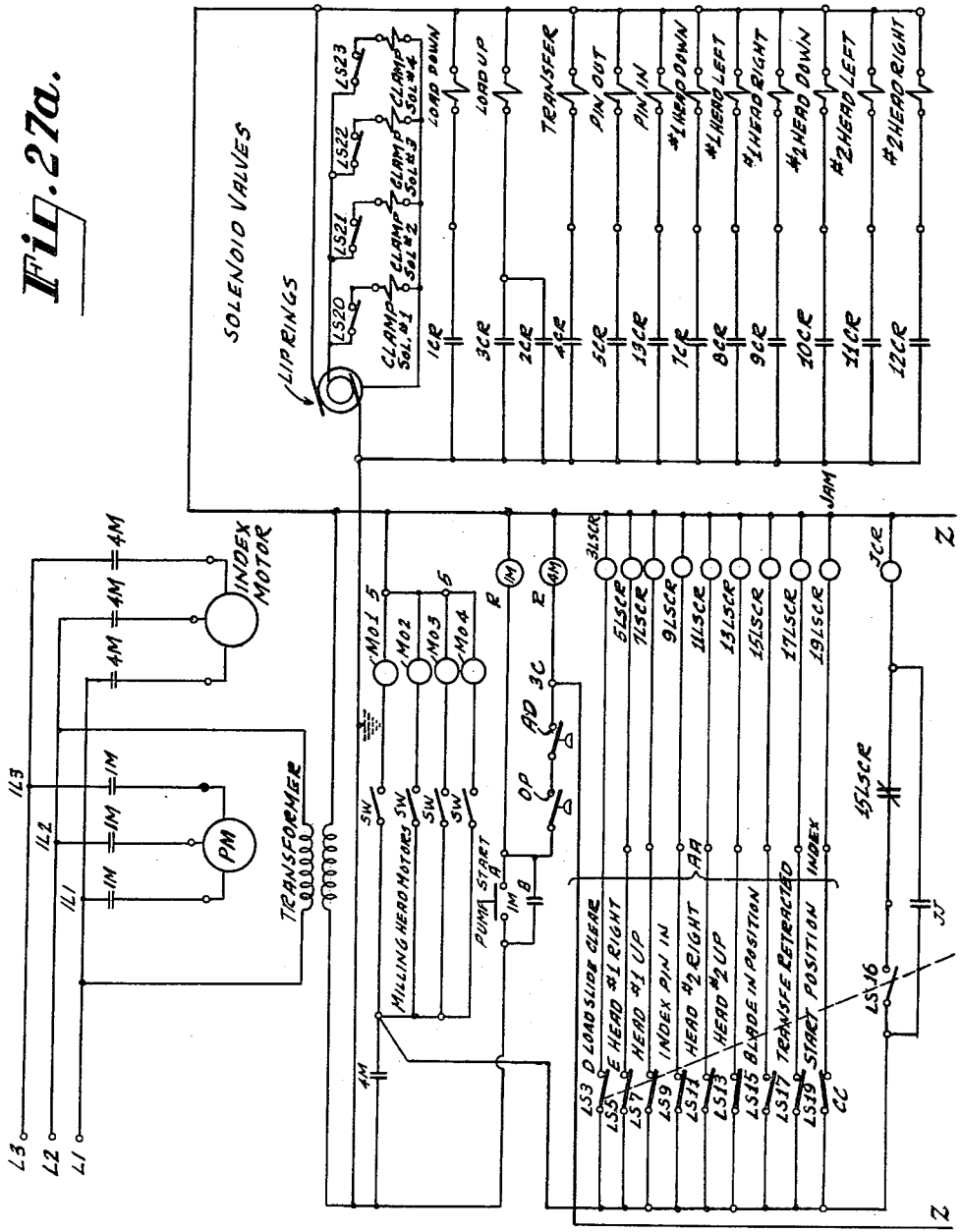

INVENTOR.
NILS HOGLUND

United States Patent Office 3,122,239
Patented Feb. 25, 1964

3,122,239
APPARATUS FOR FORMING CONTOURS
Nils Hoglund, 296 Hartshorn Drive, Short Hills, N.J.
Continuation of abandoned application Ser. No. 20,406, Apr. 6, 1960, which is a division of application Ser. No. 679,191, Aug. 20, 1957. This application Sept. 7, 1962, Ser. No. 222,773
9 Claims. (Cl. 214—1)

My invention relates to apparatus for providing formed contours in three dimension, more specifically contours spaced from and displaced longitudinally from each other. Apparatus made according to my invention also provides movement of the forming tools in three dimensions and independently of each other. More specifically, my invention relates to a milling apparatus capable of performing delicate milling operations, such as removing sharp edges from machine parts. One example is automatically breaking, radius forming or blending the edges of heads of turbine blades to remove stress points and fatigue areas and also to facilitate assembly.

This application is a continuation of my pending application, Serial No. 20,406 filed April 6, 1960 now abandoned, which is a division of application Serial No. 679,191, filed August 20, 1957, now Patent No. 2,958,262.

It is frequently necessary to remove sharp edges from machine parts. These operations have normally been done by hand either by using a file or a band burring tool similar to milling heads held by hand instead of controlled by machine. Hand operations are slow and are not uniform as no two persons can obtain uniform or similar form in such operations. The result is that hand operations make it difficult to establish engineering standards for inspecting these operations. Furthermore, in connection with turbine blades, for example, it takes, by hand operations, several minutes to deburr the dovetails and fir tree form which are means for securing the blades to the turbine wheels. The accuracy obtained from manual burring and edge breaking is not good enough to stay within engineering specification tolerances, but has been accepted to obtain production. Operations similar to the above when manually chamfering edges on wheels or odd shaped parts where it is now being done manually are also at a very slow rate.

It is an object of my invention to provide an apparatus which is capable of automatically performing delicate milling operations, more particularly, operations such as deburring, chamfering or like operations and which requires only loading of the apparatus with work pieces.

A further object of my invention is to provide such an apparatus capable of providing a uniform three-dimensional motion of the forming tools and which can be used in various kinds of equipment for performing work on work pieces having odd shaped contours.

Another object of my invention is to provide an apparatus having a work supporting and carrying member for successively positioning the work pieces and presenting them to a plurality of milling fixture assemblies with means for automatically loading and unloading work pieces on and from the work supporting member.

More specifically, it is an object of my invention to provide apparatus useful for automatically deburring turbine blades and having a rotatable turret upon which are mounted work supporting members for firmly engaging the work pieces and presenting each in turn, and successively to a plurality of milling fixture assemblies and which work supporting members can be automatically loaded and unloaded at predetermined time intervals.

Another object of my invention is to provide apparatus for fixedly holding a work piece adjacent a milling fixture assembly which is capable of moving toward, from and transversely of the work piece horizontally as well as vertically. A still further object of my invention is to provide novel cam means for causing movement of a controlled member in one direction while the member is being moved in a direction transverse to the one direction.

Another and more specific object of my invention is to provide a novel transfer and loading mechanism for moving a work piece from a supply chute to a work supporting and carrying member.

Apparatus, made according to my invention, includes a turret which can be indexed to successive positions and which carries a work piece from a loading position to successive work positions and finally to an unloading position. The turret, which is automatically indexed, is provided with a plurality of clamping devices actuated upon movement of the work pieces. The turret moves the clamping devices to successive positions when they are loaded with work pieces.

At the loading position there is provided a loading chute into which the work pieces are fed. A transfer mechanism automatically moves the work pieces to a position in the chute where a loading device which moves vertically transfers the work piece from the chute to one of the clamps on the turret. The turret is then indexed to the first milling position where a pair of milling tools movable in three dimensions, precisely forms the contour along one edge of the work piece. The turret is then indexed to the second milling position where a second pair of milling tools precisely forms the contour on the opposite edge of the work piece. The work piece is then transferred to the unloading or discharge chute where the finished work piece is unclamped and discharged.

Each milling fixture assembly includes a movable housing within which are mounted a plurality of slides supporting cams. These control the radial and transverse movements of the housing as well as the vertical movement of the milling tools whereby the milling tools may be made to move in all planes.

An index-locking mechanism is mounted adjacent the turret and engages members on the turret to fix it accurately and against rotation during the milling operations.

The movement of the turret, the transfer mechanism, loading device, milling fixture assemblies and indexing mechanism are controlled automatically by means of microswitches which in turn control fluid pressure operated pistons mounted in appropriate positions and connected to the various movable elements of the apparatus.

The invention is described in greater detail in connection with the accompanying drawings, wherein:

FIGURE 3a is a detail showing the indexing cams;

FIGURE 7 is the opposite end view in perspective of FIGURE 6;

FIGURE 8 is a plan view of the loading chute;

FIGURE 9 is a side elevation of FIGURE 8;

FIGURE 10 shows details of the device for supporting a work piece in loading position;

FIGURE 11 is a side elevation looking toward the turret of the transfer mechanism with transfer fingers removed;

FIGURE 12 is a section of the transfer mechanism taken along the line 12—12 of FIGURE 13;

FIGURE 13 is the bottom view of FIGURE 12 with the microswitch mechanisms removed;

FIGURE 15 is a vertical section of the loading mechanism taken along line 15—15 of FIGURE 16;

FIGURE 16 is a transverse section taken along line 16—16 of FIGURE 15;

FIGURES 16a and 16b are front and side views showing details of the loading fixture;

FIGURE 17 is a perspective of the turret and milling fixture assemblies with parts removed to show details of construction;

FIGURE 20 is a plan view of one of the milling fixture assemblies with parts removed to show the details of the construction;

FIGURES 21a and 21b are enlarged vertical sections taken along the line 21—21 of FIGURE 20 with the milling tool supported and slide and covers in place;

FIGURE 21c is a section taken along the line 21c—21c of FIGURE 21a;

FIGURE 22 is a section taken along the line 22—22 of FIGURE 21a;

FIGURES 25 and 26 are schematic layouts of the various hydraulic pistons and slides and the electrical switches associated therewith in the apparatus described; and FIGURES 27a and 27b are circuit diagrams.

GENERAL DESCRIPTION

(FIGS. 1, 2, 4 and 5)

Figure 1:
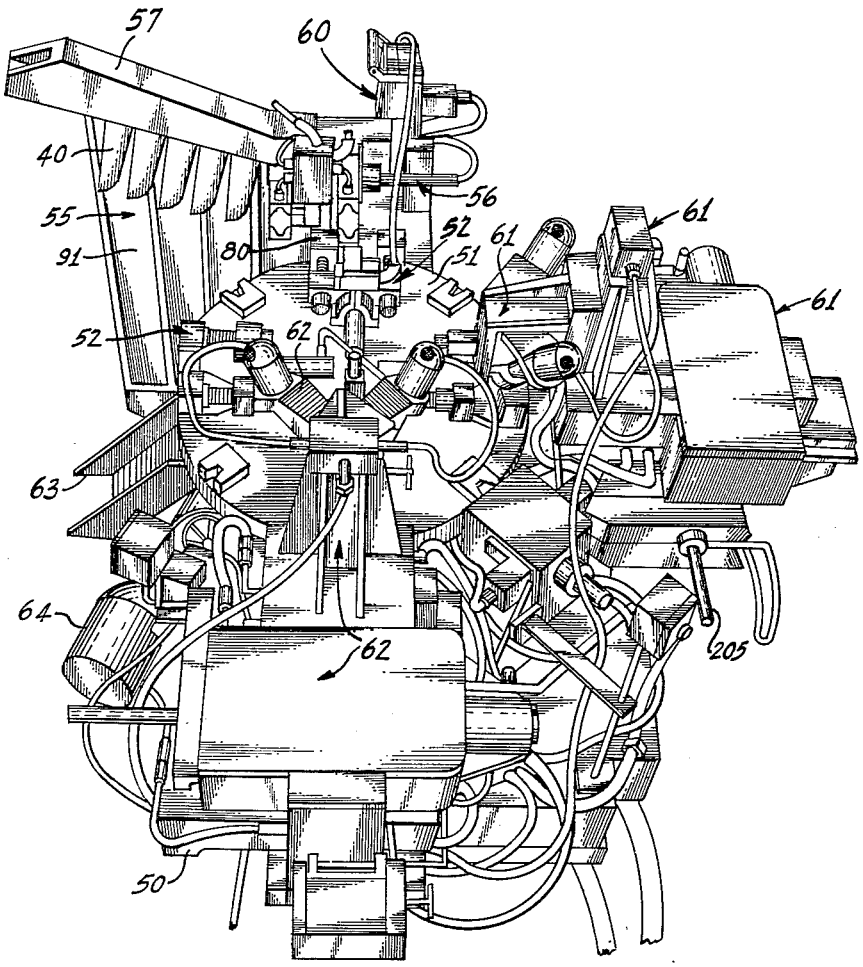
FIGURE 1 is a perspective view of apparatus made according to my invention looking from the side opposite the feed chute.
Figure 2:
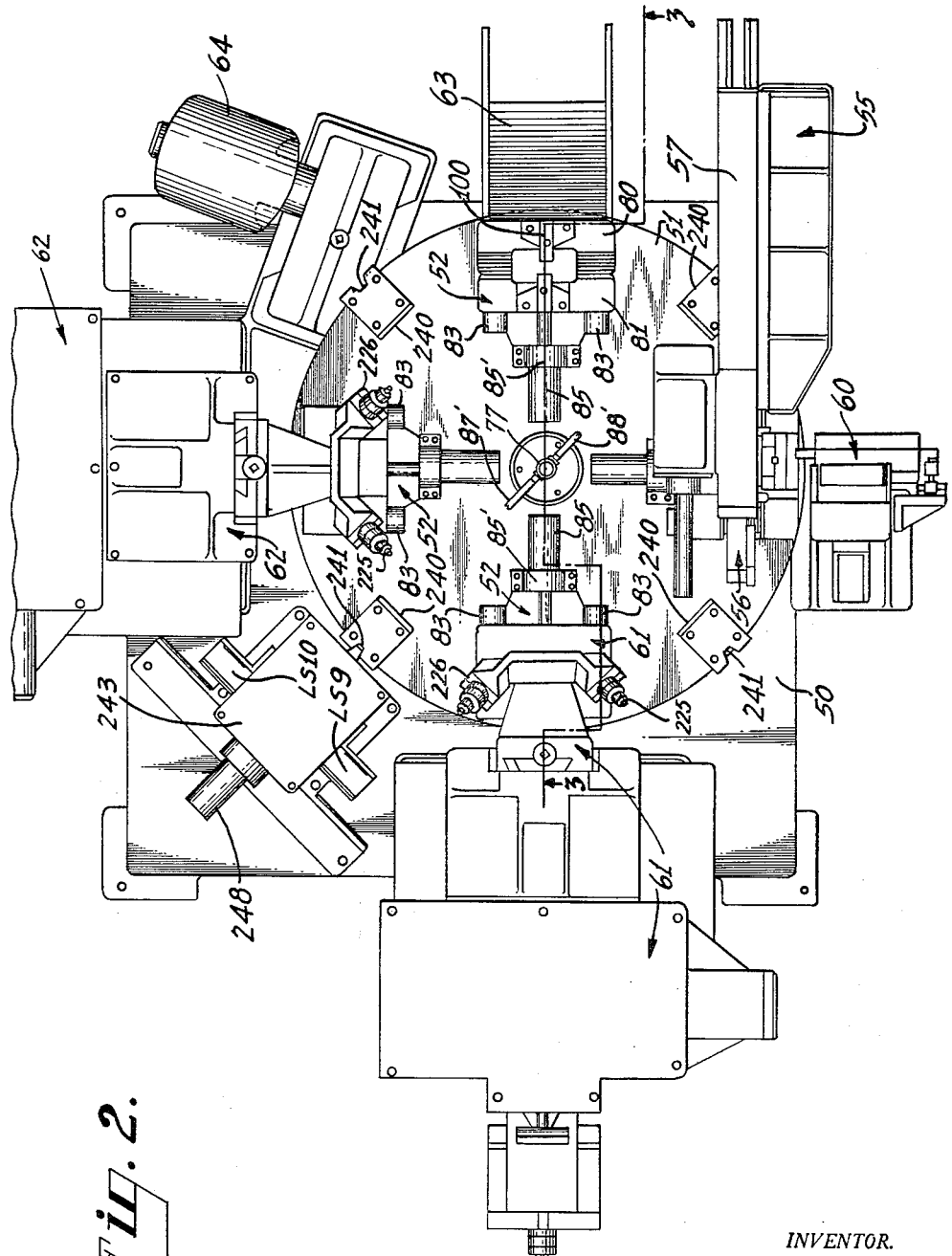
FIGURE 2 is a plan view of the apparatus shown in FIG. 1.
Figure 3:
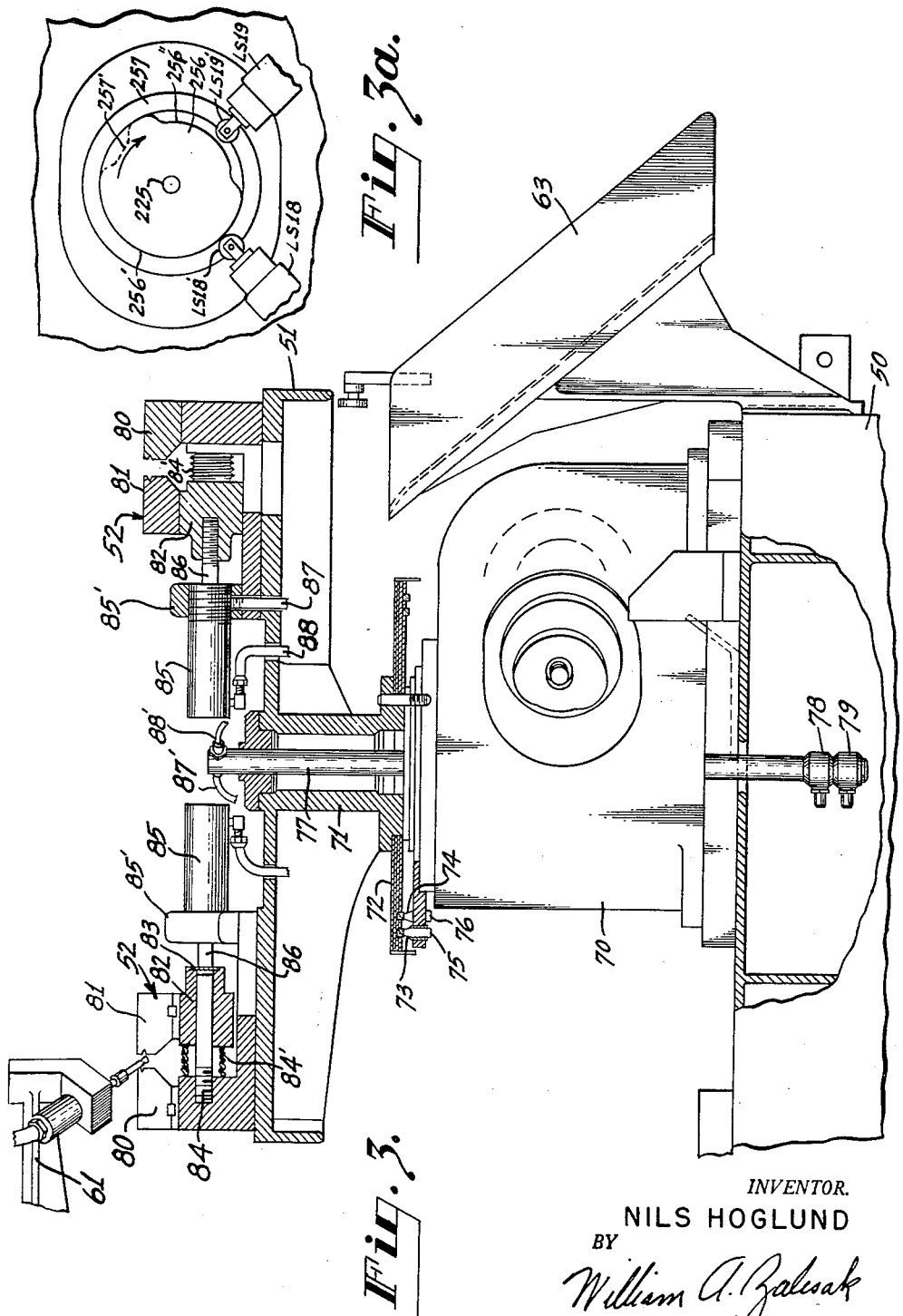
FIGURE 3 is a partial section enlarged and taken along the line 3—3 of FIGURE 2.
Figure 4:
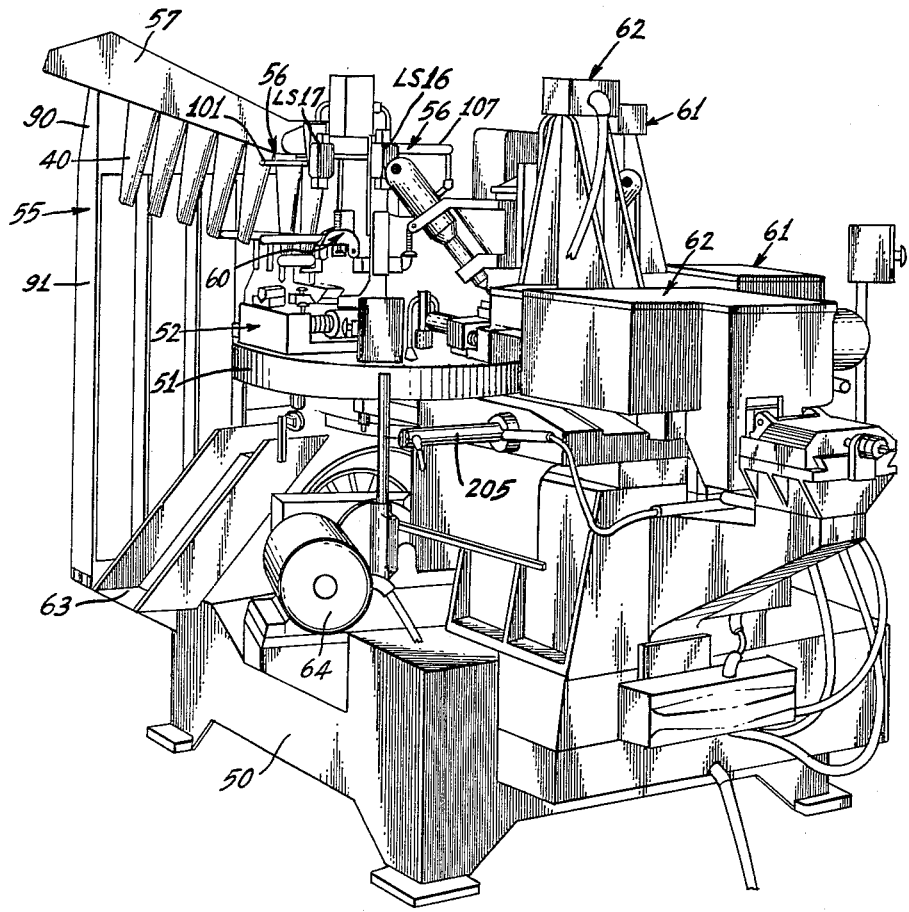
FIGURE 4 is a sideview perspective of the apparatus shown in FIGURE 1.
Figure 5:
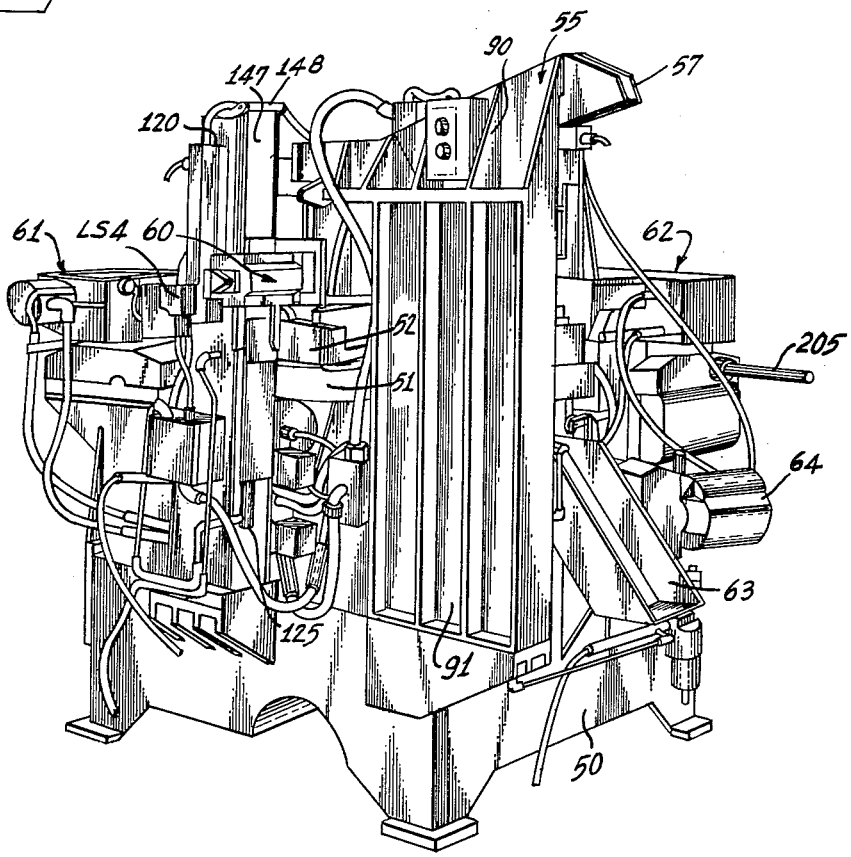
FIGURE 5 is a perspective of the apparatus shown in FIGURE 1 looking from the loading chute.
Figure 6:
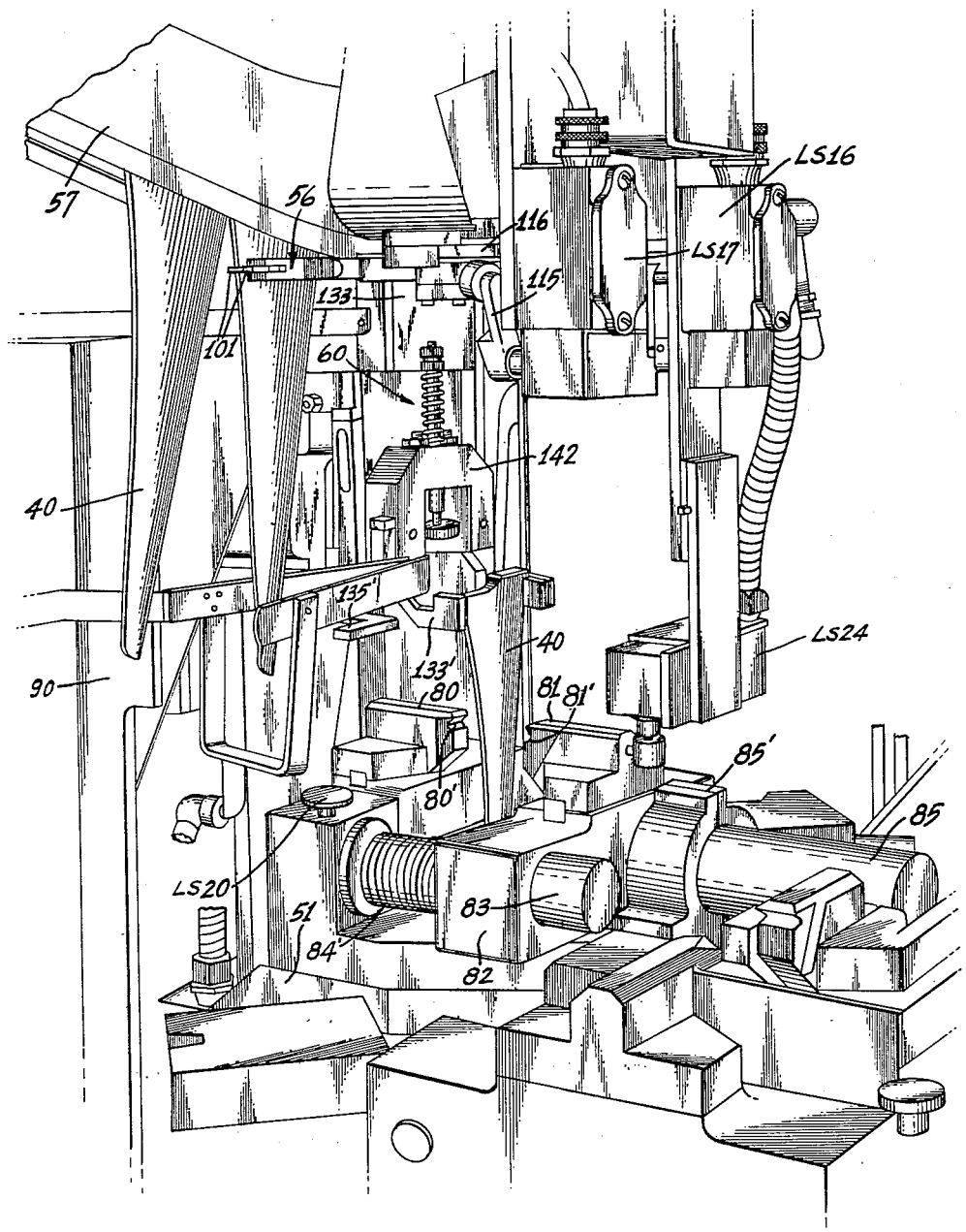
FIGURE 6 is a perspective showing the transfer mechanism, loading mechanism, and work piece clamp on the turret.
Figure 14:
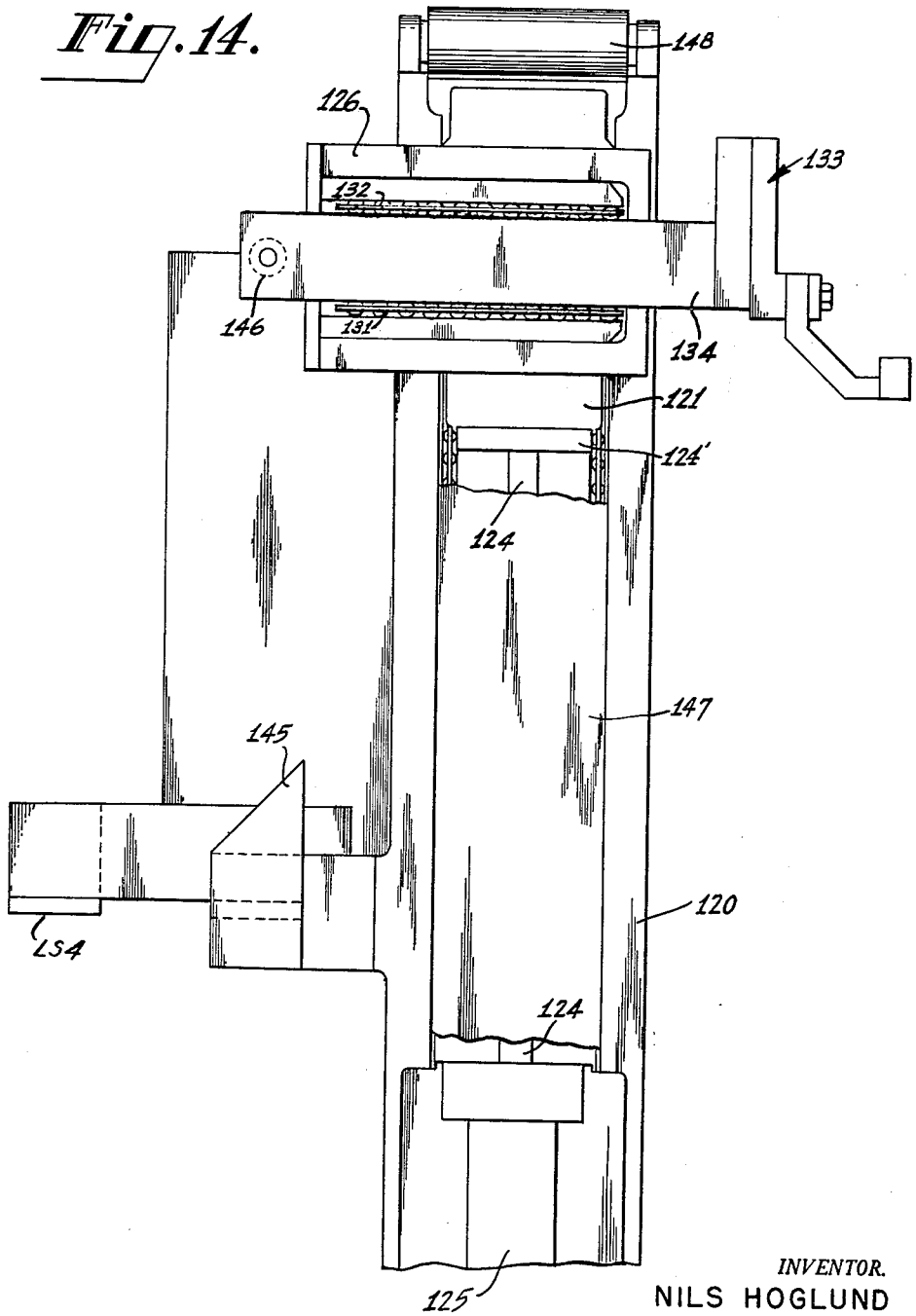
FIGURE 14 is a side elevation with parts broken away to show details of construction of the loading mechanism.
Figure 18:
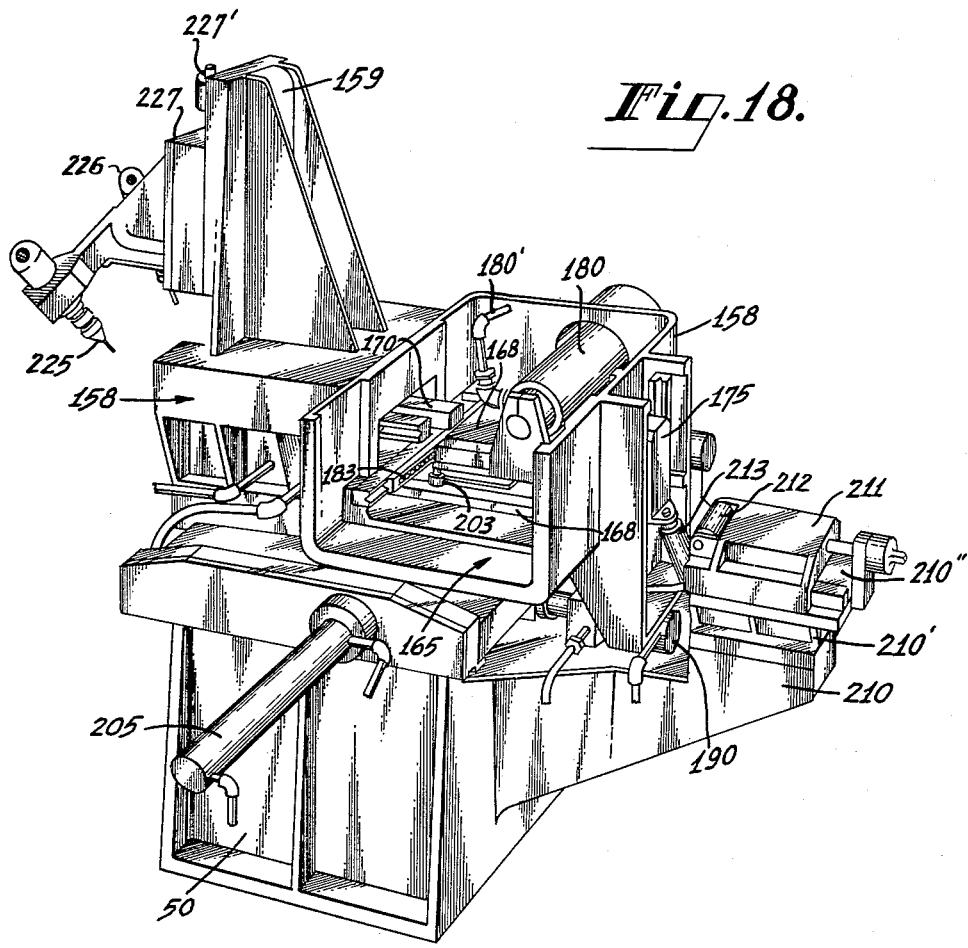
FIGURE 18 is a perspective of the milling fixture assembly with parts removed to show the main slide and other details of construction.
Figure 19:
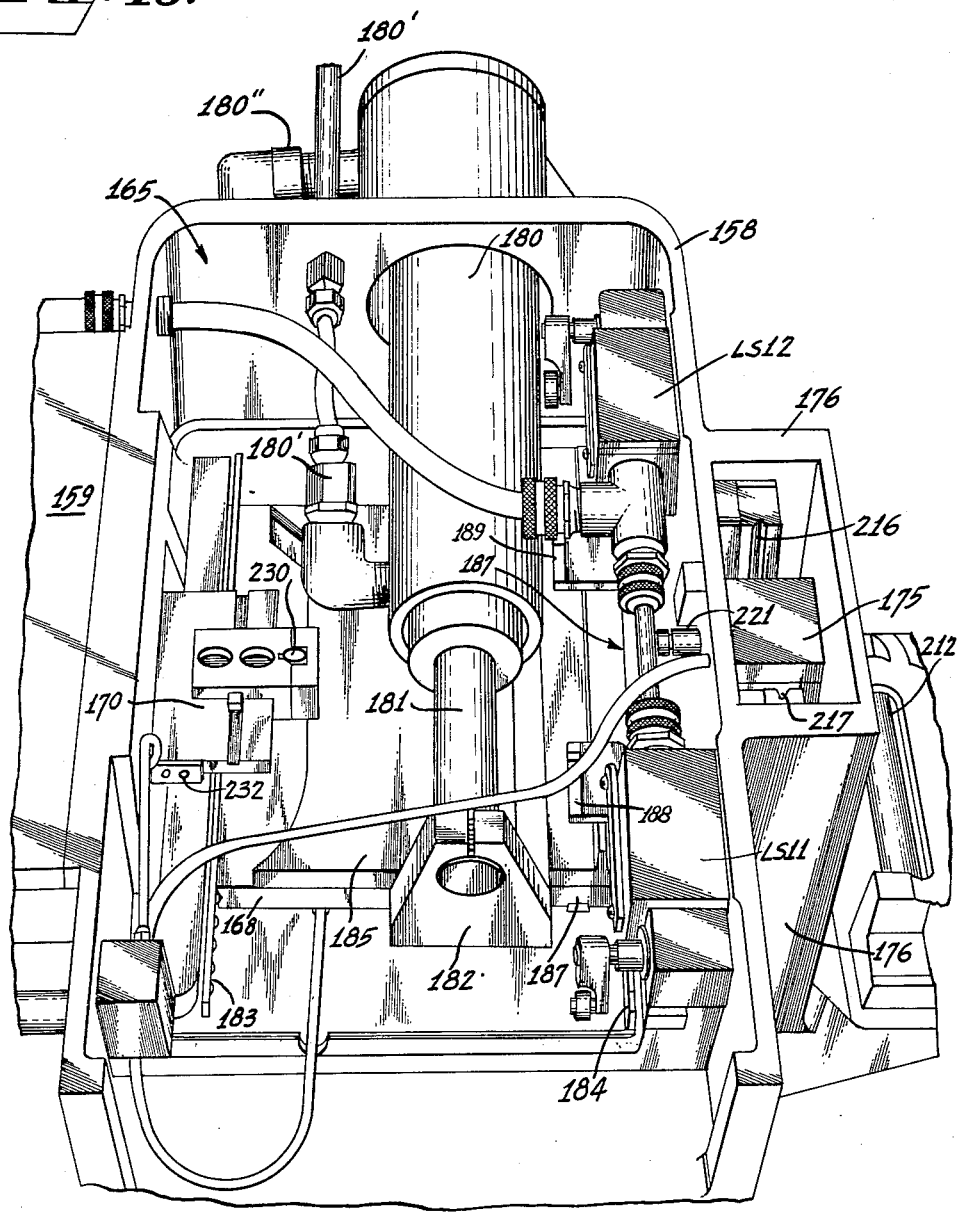
FIGURE 19 is a perspective of a portion of the milling fixture with parts removed to show details of construction.

Apparatus made according to my invention includes a supporting base or frame 50 carrying a turn table or turret 51 upon which are mounted four pairs of clamping jaws 52 for receiving and holding the work pieces in this case turbine blades which are to be milled.

The loading mechanism for loading the blades includes a loading chute assembly and support 55 provided with a transfer mechanism 56. The transfer mechanism 56 transfers the work pieces 40 in a chute 57 from the receiving position to a loading position.

In this loading position, the charge or loading mechanism 60 receives the blade or work piece 40 and transfers it vertically to the clamping jaws 52 in the loading position. Movement of the loading mechanism to the jaws automatically controls movement of the jaws 52 to clamp the work piece and to initiate movement of the turret 51 to move the work piece to the first milling position at 61. In this milling position, the work piece is subjected to the action of the milling devices mounted on the milling fixture assembly 61 where the lands on one side of the base of the blade are milled or formed. The turret then indexes again so that the blade is brought to the next station at 62 where the milling fixture assembly 62 operates on the opposite land of the blade.

Following this operation, the turret is again indexed and at the next position the completed blade is automatically discharged into the discharge chute 63. The prime mover is an electric motor 64 provided with a clutch mechanism which supplies the power for turning the turret.

The various controls both mechanical and electrical will be described below.

TURRET AND CLAMPING JAWS

(FIGS. 2, 3, 6 and 7)

The turret is rotatably supported on the base or frame by means of a hollow shaft through which fluid under pressure is directed to the hydraulically operated jaws and carries a control disc for the electrical controls.

Figure 23:
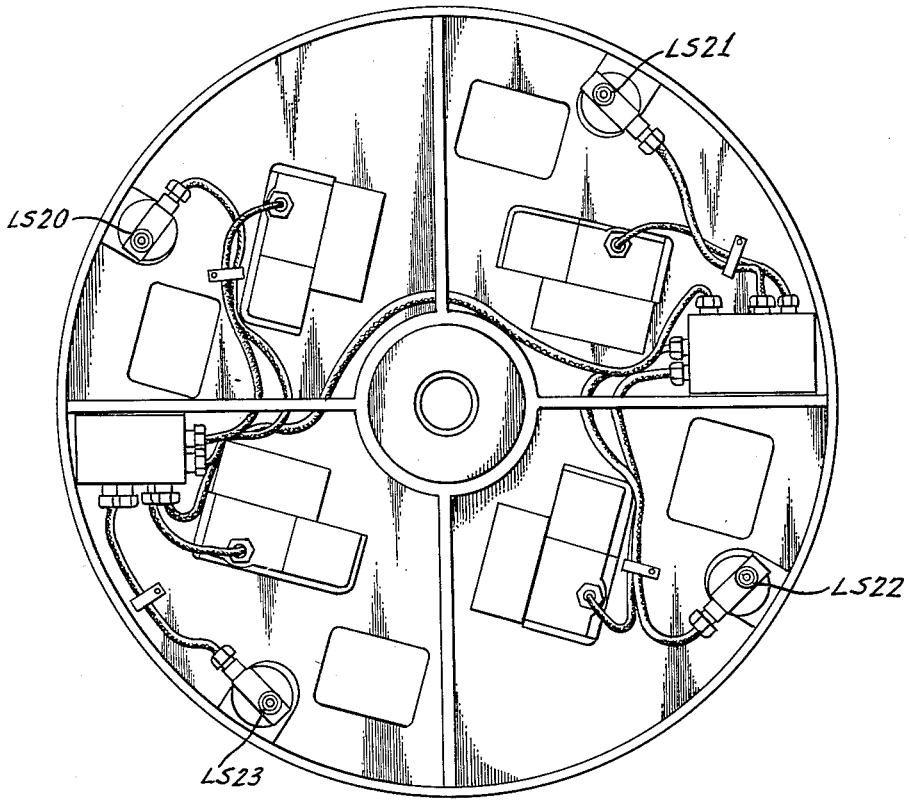
FIGURE 23 is the under side of the turret showing some of the electrical controls.
Figure 24:
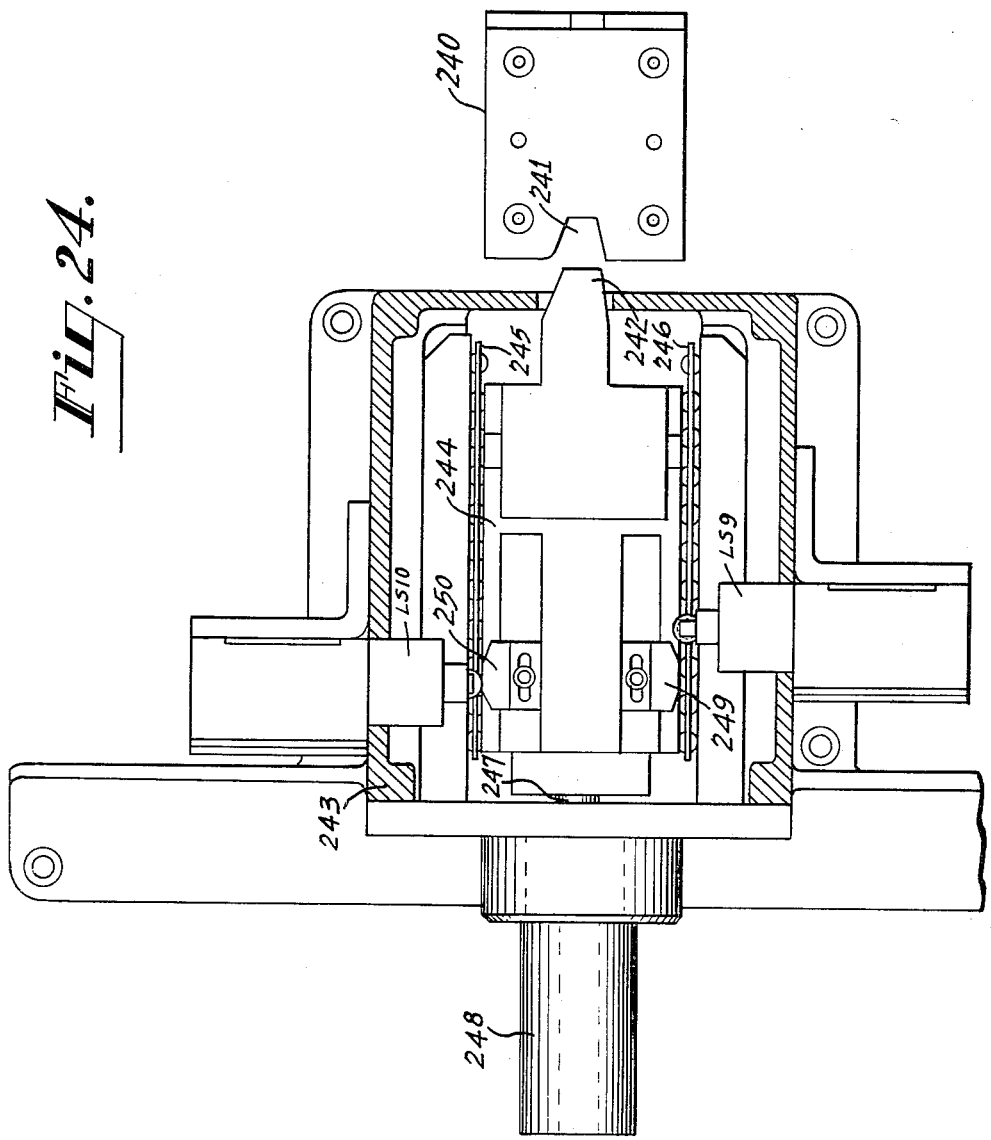
FIGURE 24 is a plan view with cover removed of the index locking mechanism.
Figure 27B:
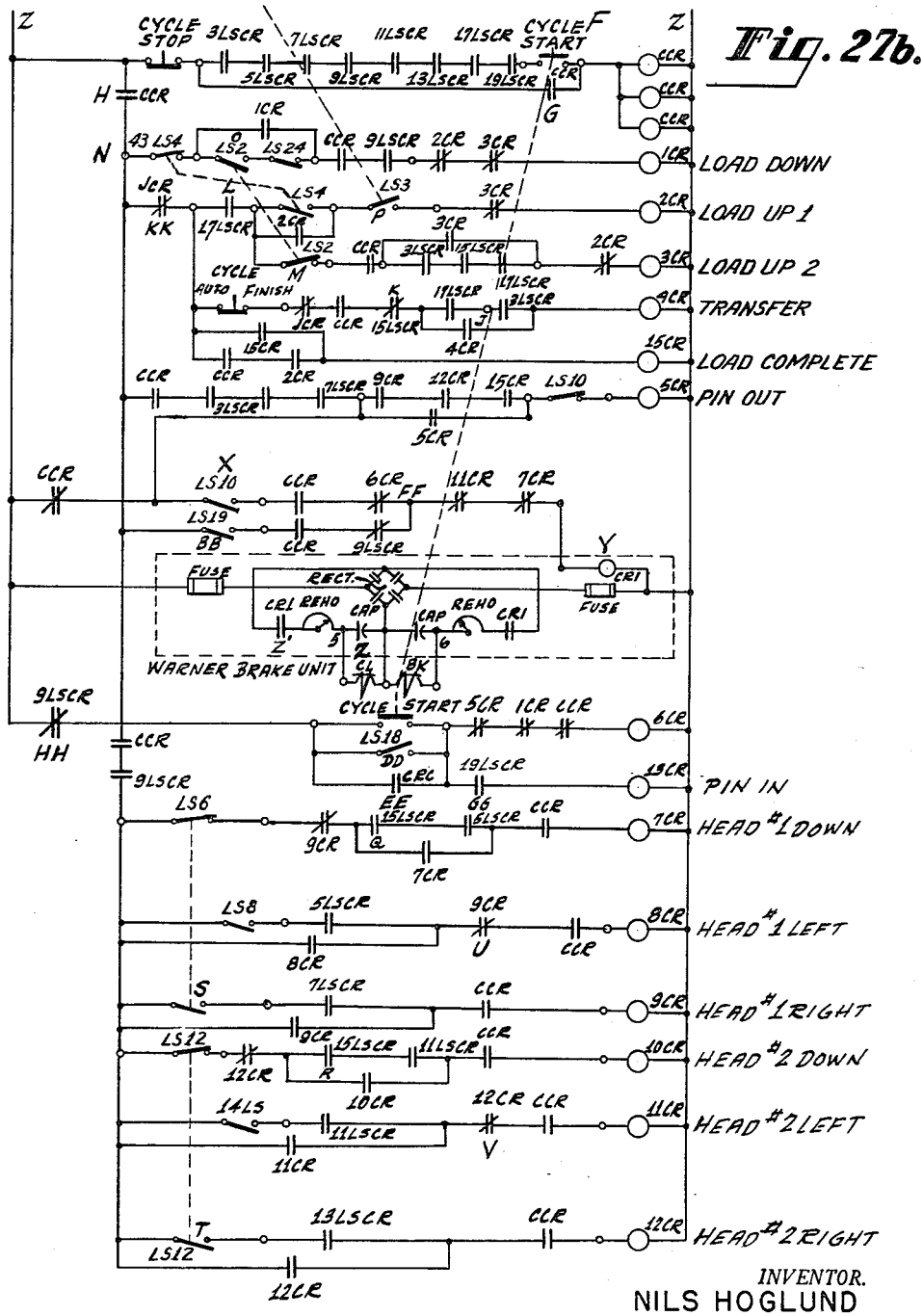

The housing 70 (FIGURE 3) rotatably supports the turret 51 on top of the base or frame 50 by means of a hollow shaft 71 connected to motor 64 by meachanism not shown. The shaft 71 not only supports the turret 51 but also a rotatable disc 72 which carries conducting rings 73, 74 to provide control circuits controlled by switches mounted on the undersides of the turret or turn table as will be described in greater detail in connection with FIGURE 23. The brushes 75, 76 in contact with the rings provide the external circuit connections. The hollow shaft 71 has within it the double passage conduit 77 which rotates with the turret for feeding the hydraulic cylinders of the clamping jaws 52. This conduit is supplied through stationary couplings 78, 79.

Each pair of clamping jaws includes a stationary jaw 80 and a movable jaw 81. The movable jaw 81 is mounted on a slide member 82 having cylindrical chambers 83 at opposite sides for slidably receiving a fixed guide 84 for accurately guiding the movable clamp 81 when hydraulically operated piston 85 mounted on bracket 85' and connected to slide 82 by piston rod 86 moves the clamp to closed position to clamp a blade. The clamping jaws are provided with the dust shields or bellows boots 84' for the guides 84.

Fluid under pressure is fed to and from piston 85 by means of conduits 87 and 88 connected under the turret to the conduits 87' and 88' through hydraulic solenoid valves attached to conduit pipe 77. At the proper time when a blade is positioned between the jaws 80 and 81 by the loader to be described, the jaws move automatically to closed position to firmly clamp the blade.

LOADING CHUTE AND TRANSFER ASSEMBLY

(FIGURES 6, 7, 8, 9, 10, 11, 12 and 13)

Referring first to FIGURES 8, 9 and 10, an inclined loading chute 57 feeds the work pieces or blades 40 by means of a transfer mechanism 56, shown in detail in FIGURES 11, 12 and 13, to a loading position. The chute 57 is supported on a webbed supporting wall 90 which in turn is mounted on base 50 by webbed wall 91. The track portion 92 of the chute is provided with a slot 93 so that the blade heads can slide down the track with the blades hanging perpendicularly through the slot 93. When the blades slide to a position at A, the transfer mechanism 56 comes into play (FIGURES 6, 7 and 8) to move the blade into loading position B. In this position a receiver, shown in detail in FIGURES 9 and 10, positions the blade for transfer to a clamping mechanism 52 on the turret. The receiver (FIGURES 10 and 11) includes a pair of pivoted members 95 which are urged toward each other by springs 96. The pivoted members 95 are adjusted to receiving position by adjusting screws 97 and the adjustable holding block 98. These last elements are all mounted in a U-shaped frame 99 within the chute 57. The blade 40 is retained in this position until the loading mechanism, to be described, moves into its upper position to release the blade and lower it into position in a pair of clamping jaws.

The transfer mechanism (FIGURES 6, 11, 12 and 13) includes a fluid pressure operated slide supporting a pair of pivoted fingers which can rotate upon contact with a blade to permit movement of the slide to blade engaging position but which lock in position to engage a blade and move it to loading position. Pivoted fingers 101 and 102 are mounted on the slide 103 by means of block 103' and are biased to the position shown by springs 101' and 102'. Slide 103 is slidably mounted in housing 104 by means of ball bearing assemblies 105 and 106. The slide is connected to piston 107 by means of rods 108 and bracket 109 fastened to slide 103. Fluid under pressure is fed to the piston by means of conduits 110 and 111 (FIGURE 7). Limit switches LS16 and LS17 are mounted at the ends of the path of travel of slide 103 and control circuits of solenoid operated valves which in turn control movement of the slide in a manner to be described. These switches are provided with tripper arms 114 and 115 which are operated by cams 117 and 118 on slide 103.

When the transfer mechanism moves to position A from position B, the arms can pivot clockwise looking down on the mechanism and pass by the blades in the chute. When piston 107 is operated to move a blade to loading position, the fingers remain as shown in FIGURE 13 engaging the edges of two adjacent blades and slides one into position B where it is received by the mechanism shown in FIGURE 10, and the other into position A.

LOADING ASSEMBLY

*(FIGS. 5, 6, 7, 14, 15, 16, 16a and 16b)*

The loading assembly comprises a vertically moving slide having mounted thereon a transversely slidable cradle-like extension. The slide and cradle move upwardly from a neutral position to engage the blades or work pieces and remove them from the loading position in the chute and then downwardly to position the blades between a pair of clamping jaws on the turret. When the loading device reaches its lower-most position, it trips a switch on the turret. This switch controls the closing movement of the jaws after which the loading device returns to a neutral position midway between its upper and lower positions to be operated again when a new blade is to be loaded.

After a blade has been moved to the loading position on the chute by the transfer mechanism 56 (FIGURE 8) and the transfer mechanism has been returned, the blade is released and picked up by the loading mechanism 60 which then lowers the blade to a position between the jaws 80 and 81 of one of the clamping mechanisms 52 on the turret 51. The jaws are provided with notches or slots 80' and 81' for receiving the lands on the work pieces or blades when the blades are clamped between the clamping jaws on the turret.

This loading mechanism 60 (FIGURES 14, 15 and 16) includes a housing 120 in which is mounted the slide 121 slidably mounted for vertical movement by means of ball bearing assemblies 122 and 123. Slide 121 is connected by piston rod 124 and bracket 124' to fluid pressure operated piston 125.

A housing 126 and a housing cover 127 are mounted on the slide 121. A second slide 130 slidably mounted in bearings 131 and 132 and movable transversely of slide 121 has secured thereto the cradle 133 by means of bracket 134. Cradle 133 is provided with pivotally supported arms 133' which receive the blade 40. A biasing spring 136 having a spring guide 137 fixed in cover 127 and pushing against bracket 134' urges the slide 130 and cradle 133 to the right as viewed in FIGURE 14. The tripper arm 135' operates the switch LS20 on its downward movement to cause the clamping jaws to move to closed position.

The arms 133' of the cradle sub-assembly 133 are pivoted at 135 and are provided with the lever extensions 138 which engage the head 139 of the pin 139' slidably mounted in the yoke 142 and biased upwardly by spring 143.

When the loading mechanism moves upwardly and the arms 133' engage a work piece, the arms 133' swing outwardly to pass the lands of the work piece compressing spring 143 and then snap back over the work piece. The arms are locked against inward movement and hence carry the work piece downwardly when moving to the lower position, the arms 95 (FIGURE 10) of the holding device in the loading position being free to move outwardly to release the blade 40.

Mounted on the housing 120 by means of brackets 140 and 141 are the switches LS2 and LS3. These are operated by cam 144 carried on slide 121. These switches control circuits to be described.

Mounted on the housing 120 is a tapered cam 145. This cam is engaged by follower 146 mounted on slide 134. When slide 121 moves to its lower-most position, this causes the slide 130 and cradle 133 to be pulled to the left or radially outward from turret 51 as viewed in FIGURE 14 and also operates LS4 which, as will be described, controls movement of slide 130 to move up to neutral position. The cradle and blade carried thereby follow the path shown in dotted line in FIG. 25 to position the blade land in registry with the slots 80' and 81', switch LS20 being closed first to cause jaw 81 to move to closed position, and then switch LS4 is operated to cause return of the cradle to its neutral position.

A dust shield 147 in the form of a web of flexible rubber attached to housing 126 covers the housing 120. An extension (FIGURE 5) is rolled onto roller 148 mounted on housing 120, the roller being attached to the housing 126.

MILLING FIXTURE ASSEMBLIES

*(FIGS. 17, 18, 19, 20, 21a, 21b, 21c and 22)*

The milling fixture assembly includes, in effect, two major sub-assemblies. The lower assembly includes a three-compartment housing in which are mounted the main slide and the ratio slides on which are mounted the ratio cams. These mechanisms control the movement of the housing, slides and cams parallel to and transversely of the work pieces. One of the slides and its associated cam controls the vertical movement of the milling tools.

The other major assembly, which may be referred to as the upper assembly, and which is mounted on the lower assembly includes the vertically movable milling tool slide, milling devices and follower which contacts one of the ratio cams in the lower assembly.

Figure 22:
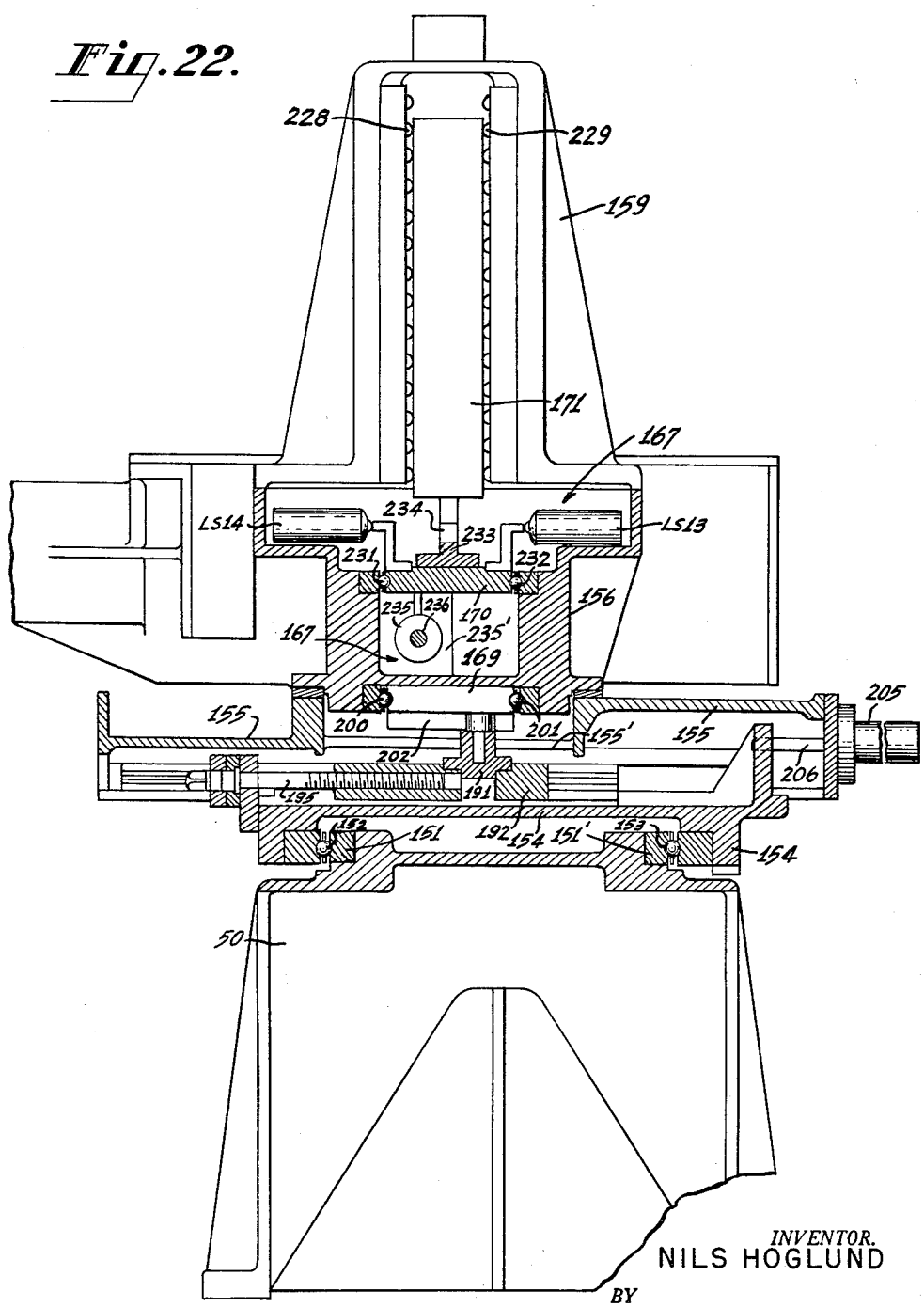

Referring to FIGURES 17, 18, 20, 21a, 21b, 21c and 22, the milling fixture assemblies 61 and 62, previously referred to, are each slidably mounted on a frame 150 by means of slide guides 151 and 151' and bearing assemblies 152 and 153 (FIG. 22). A multipart housing including a base slide member 154 slidably mounted by means of the bearing assemblies 152 and 153 in turn slidably supports the base 155 of the housing by means of bearing assemblies 156 and 157 (FIGS. 21a and 21b). Base slide 154 permits movement of the milling fixture assemblies radially of the turret 51, and slidable base 155 of the milling fixture permits movement of the fixture normal to this radial movement so that the milling heads can be moved parallel to the edges of the blades being milled. Mounted on slidable base 155 is a two-part housing including the lower portion 158 housing the contour and ratio slides and the upper portion 159 housing the slide on which the milling tools are mounted. Covers 160, 161, 162 and 163 complete the housing.

The lower part of the housing 158 may be considered as providing three compartments 165, 166 and 167 in which are mounted the various contour and ratio slides including the main slide 168, the intermediate ratio slide 169 and the contour ratio cam slide 170. The milling tool slide 171 is mounted in the vertical or upper portion 159 of the housing.

In addition to the slides so far referred to, there is an additional vertically movable cam slide 175 (FIGURES 18, 19, 20 and 21b), carried in extensions 176 attached to the housing 158. The slide 175 enters into the control of the radial movement of the housing 158 and the milling tools at certain times to be described.

MAIN SLIDE

*(FIGURES 18, 19, 20, 21a and 21b)*

The main slide 168 mounted in the compartment 165 of the housing 158 is driven by a fluid pressure mechanism and controls the radial movement of the housing and milling device toward and from the turret 151. It also controls the movement of the housing and tools normal to this radial movement or parallel to the surfaces being formed. It also controls the vertical movement of the dressing or milling tools. This main slide and its cam attachment will now be described.

Mounted in the compartment 165 of the housing 158 is the slide 168 which is supported by bearing assemblies 183 and 184 (FIGURES 21a and 21b). The slide is moved normally to a radial movement of the housing when the cylinder 180 and piston 181 are energized. The fluid pressure operated piston and cylinder 180 are connected to slide 168 by piston rod 181 and bracket 182. Conduits 180' and 180" provide the fluid under pressure for the piston and cylinder.

Mounted on the slide 168 are the contour cam 185 on top controlling vertical movement of the milling tools, the contour feed cam 186 on the bottom, controlling the movement of the housing and milling tools normal to the radial movement, and the cam assembly 187 on top controlling the radial movement of the housing and milling tools. Cam assembly 187 includes dogs 188 and 189 for operating switches LS11 and LS12 as will be described.

NORMAL MOVEMENT OF MILLING FIXTURE ASSEMBLY

*(FIGS. 21a, 21b, and 22)*

The mechanism for determining the normal movement and position of the housing and milling tools with respect to the work piece is described below.

As previously set forth above, the whole milling assembly mounted on the base slide 154 is slidably supported on the frame 150 by slide guides 151 and 151' and bearing assemblies 152 and 153 (FIG. 22). Attached to the base slide 154 is a fluid pressure operated cylinder and piston 190 which acts as a biasing spring urging the entire assembly to the right (FIG. 21b) or radially outward from the turret.

An adjustable follower 191 fixes the position of the assembly initially and also controls the movement of the housing. The follower 191 is atatched to the slide 192 mounted by means of bearing assemblies 193 and 194 and is adjusted by means of screw 195 (FIG. 22). This action fixes the position of the follower 191 on the slide 154 for further operations.

The slidable base 155 is provided with a slot 155' through which the follower 191 extends. Slide 169, previously referred to, is slidably mounted by bearing assemblies 200 and 201 (FIG. 22) and has mounted on its underside a ratio feed cam 202 engaging follower 191 and on its upper side, a follower 203. Cam 202 is of elongated triangular shape and increasing in width away from the viewer in FIGURE 22. The follower 203 engages the contour feed cam 186 mounted on the underside of the main slide 168.

The radial movement of slide 169 and normal movement of the milling tool assembly is controlled by movement of the main slide 168 and cam 186. The cam 186 and follower 203 are urged into contact with each other by means of the fluid pressure operated cylinder 205 and piston 206 (FIGURE 22) fixed to the base slide member 154, the piston being fixed to the base 155 of the housing. The contour feed cam 186 is an elongated cam of triangular shape.

Assuming the base slide 154 stationary, and pressure in cylinder 205, the slide 154 is biased to the right (FIGURE 22). This maintains follower 191 in contact with the triangularly shaped ratio cam 202 on slide 169. This pressure on ratio cam 202 is transmitted by means of slide 169 to the follower 203 which is urged in turn against ratio cam 186 in main slide 168. When the slide 186 is caused to move when cylinder 180 is energized, slide 169 is caused to move to the right or left which movement is determined by the contours in feed cam 186. The movement of slide 169 will thus cause ratio cam 202 to push the entire assembly 155 to the left or right (FIGURE 22), that is, parallel to the work piece, as the ratio cam 202 moves against the follower 191.

RADIAL MOVEMENT OF MILLING FIXTURE ASSEMBLIES

*(FIGS. 18, 20, 21a, 21b, and 22)*

Mounted on frame 150 is a bracket member 210 upon which is supported the slide guide support 210' and slide guide 210" on which is slidably mounted housing 211. At the inner end of housing 211 there is supported a roller cam 212 contacting the roller cam 213 carried on slide 175. The position of the roller cam 212 is determined by the adjusting screw 214 connected to the slide housing 211. As will be described, the relative positions of roller cams 212 and 213 determine the initial as well as other radial positions of the milling fixtures.

The slide 175 is mounted for vertical movement by means of bearing assemblies 216 and 217 (FIG. 20) mounted in the extensions 176. A biasing spring 218 urges the slide 175 downwardly urging a cam follower and cam described below into contact.

The slide assembly 187 (FIGS. 19 and 21b) has mounted on one side the vertically mounted contour cam 220. It is in contact with the follower 221 mounted on and fixed to slide 175. Thus, as the main slide 168 moves back and forth, cam 220 moves slide 175 up and down vertically. Since cam 212 is fixed, the milling fixture assembly and housing move to the left or inwardly radially of the turret as the slide 175 moves upwardly, and to the right or outwardly radially as the slide 175 moves downwardly (FIGURES 21a and 21b). From the description above, it will be seen that the whole milling assembly will move radially on slide guides 151 and 151'.

MILLING TOOLS

*(FIGS. 18, 19, 20, 21a, 21b and 22)*

The electrically driven milling tools 225 and 226 are supported by means of brackets such as 227 adjustably mounted on a slide 171. These are adjusted on slide 171 by screw 227'. Slide 171 is slidably mounted in bearing assemblies 228 and 229 and housing 159.

Supported on the main slide 168 is the contour cam 185 which is contacted by the follower 230 mounted on slide 170. The slide 170 in turn is mounted by means of bearing assemblies 231 and 232 (FIGURE 22). A ratio cam 233 is fixed to the inner or turret end of slide 170 and contacts follower 234 mounted on slide 171. As slide 170 is moved radially of the turret when slide 168 is moved back and forth, slide 171 is moved vertically up and down by cam 233 and follower 234. Biasing of slide 171 and follower 234 against cam 233 is by gravity. The weight of the milling tools 225 and 226 provide the necessary force. Slide 170 has dogs 172 and 173 mounted thereon to operate switches LS13 and LS14 as will be described.

At times during operation of the milling fixture assembly, it is necessary to operate the slide 171 independently of the main slide 168, to raise the milling tools. This is done by means of the fluid pressure operated cylinder 235 (FIG. 21a) fixed to housing portion 158 by bracket 235' and having a piston rod 236 in contact with bracket 237 which is fixed to slide 170. The cylinder 235 may be energized as will be described to move slide 171 to the left against gravity to raise the milling tools at predetermined times. This is at the end of the milling operation to move the heads carrying the milling tools out of the way to permit indexing of the turret 51. When cylinder 235 is energized, it raises the tools to maximum height. This action is independent of the contour on contour cam 185. When the turret has completed indexing and a new cycle is to start, the fluid pressure in cylinder 235 is reversed to retract piston rod 236 to the right (FIGURE 21a) causing the slide 170 to move to the right permitting follower 230 to again contact contour cam 185.

INDEX FIXTURE ASSEMBLY (FIGS. 2, 17, 24 and 26)

The index fixture assembly is a mechanism for fixing turret 51 against rotation during the milling operations after each indexing operation.

It includes equally spaced lock blocks 240 fixed to turret 51 and each provided with V-shaped slots 241 into which a movable finger 242 moves and remains during milling operations. This finger is slidably supported on mechanism to be described and mounted within the housing 243. During indexing the finger 242 is withdrawn from the slot 241.

A slide 244 is mounted within housing 243 on bearing assemblies 245 and 246. The finger 242 is fixed to the slide 244. The slide 244 is connected to the piston rod 247 mounted in the cylinder 248. The fluid pressure operated piston 247 is energized to move the locking finger into and out of engagement with the slots 241 as will be described. Dogs 249 and 250 are mounted on the slide 244 to operate control switches LS9 and LS10 for purposes to be described.

INDEXING TIMING MECHANISM (FIGS. 1 and 3a)

The standard gear reduction motor 64 is constantly running. It is intermittently connected to drive shaft 71 by means of a magnetic clutch to index turret 51. The motor is also connected to drive the shaft 255 of the indexing timing mechanism on which are mounted cams 256 and 257 having the high spots 256' and 257' and the low spots 256" and 257". These cams control the limit switches LS18 and LS19 in a manner to be described below.

CONTROLS AND ELECTRICAL CIRCUITS (FIGURES 24, 25, 26, 27a and 27b)

The various slides in FIGURES 25 and 26 are shown in their initial positions with the various cams or dogs in contact with the various microswitches. The contacts shown in FIGURES 27a and 27b of the electrical circuits are in their initial positions either as normally closed or normally open and are held by the various dogs in the various slides. Power to the contacts, relays and motors is supplied from the lines L1, L2 and L3 and transformer T connected across L1 and L2. The milling head motors MO1, MO2, MO3 and MO4 are all connected across the secondary of transformer T when contact 4M is closed, as will be described.

When the start button at A is closed, a circuit is completed through relay R1M which closes all the 1M contacts placing an interlock around the start button and closing the circuits to the pump motor PM. When the oil pressure and air pressure are built up, switches OP and AP are closed, energizing relay R4M. This closes the circuit to the milling head motors through contacts 4M and supplies power to all of the circuits.

Referring now to FIGURES 25 and 26 with the loading slide 121 in the position shown, that is, its intermediate position, LS3 is held closed as shown in the wiring diagram. This then energizes relay 3LSCR. Slide 168' carrying No. 1 milling head is to the left, looking out radially from the center of the turret. This keeps LS5 closed, thus energizing relay 5LSCR. Slide 170' is in toward the center of the turret holding LS7 closed, energizing relay 7LSCR. The milling head is to the right and up looking out radially from the turret. The index pin slide 242 is in holding position while LS9 is closed, thereby energizing relay 9LSCR. Milling head No. 2 is up and to the right, with slide 168 to the left keeping LS11 closed and energizing relay 11LSCR. Slide 170 is in, keeping LS13 closed and energizing 13LSCR.

With no blade in position for the loading at the beginning of the operation, LS15 is open and relay 15LSCR is therefore not energized. The transfer mechanism, looking in radially at the turntable, is to the right, slide 56 being to the right. Switch LS17 is closed energizing relay 17LSCR. Referring to FIGURE 3a, switch LS19 is riding on cam 256 and is in the low portion of the cam allowing switch LS19 to remain normally closed. These are all shown within the area AA of the diagram.

To start the cycle switch F, the cycle start switch is closed. Since all of the contacts in series with switch F were closed when their respective relays were energized, circuits are now completed through all CCR relays closing the contact G to provide an interlock around switch F and closing switch H to provide power to the relays controlling the oil valve solenoids for the fluid pressure operated pistons controlling the various slides.

Referring to the transfer circuit, since relay JCR, the jam control relay, is not energized, contact JCR is closed as are contacts CCR, 15LSCR (relay 15LSCR being de-energized) 17LSCR, and 3LSCR, relay 4CR is energized closing interlock 4CR at J. This closes contact 4CR in the solenoid valve circuit controlling piston 107 to cause the transfer mechanism to move to the left looking radially in at the turret to move a blade from position A to position B.

As the blade comes into position B it closes switch LS15 energizing relay 15LSCR. This opens contact 15LSCR at K de-energizing relay 4CR and the transfer solenoid. This solenoid is spring returned and hence causes slide 116 to return to its initial position to pick up another blade, again closing LS17 and re-energizing relay 17LSCR.

Referring now to the "Load Up 2" circuit, with 17LSCR at L closed, 2LS at M closed, CCR closed, and the rest of the contacts in series therewith closed, LS3 being held closed by slide 121, the blade being in position and keeping switch LS15 closed, and the transfer slide back keeping LS17 closed, relay 3CR becomes energized. Interlock 3CR closes as does the switch 3CR in the solenoid valve circuit. The hydraulic cylinder 125 is energized causing the loading slide and loader to move up to receive a blade. In its upper position dog 144 in slide 121 opens 2LS at M and de-energizes 3CR stopping the upward movement of slide 121.

Referring now to the "Load Down" circuit, LS2 at O is now closed, and since all of the other contacts in series are closed, relay 1CR is energized, closing interlock 1CR and contact 1CR in the solenoid valve circuit. Switch LS24 is closed since the clamping jaw 81 is open and in contact with LS24. These energize the solenoid controlling slide 121 to bring the loader down with a blade to the clamping jaws. As the loader slide 121 comes down, finger 135 (FIGURES 16 and 25) trips the limit switch LS20. This energizes the solenoid in series with LS20 in the solenoid valve circuit to cause the cylinder 85 to become energized closing the jaws 80—81 on a blade. As described above after switch LS20 is closed to close the clamping jaws 80 and 81 on the blade of the turret, the switch LS4 in the "Load Down" circuit is opened de-energizing 1CR and stopping the slide 121 in its downward movement.

Referring now to the "Load Up 1" circuit, since the transfer mechanism is still retracted LS17 is closed and relay 17LSCR is energized. Since LS3 is not contacted by the dog on slide 121 it being below its intermediate position 3LS at P is closed, as is LS4 in this circuit. Relay 3CR is thus energized. Interlock 2CR closes around LS4 so that the circuit remains closed, when slide 121 moves up. Switch 2CR in the solenoid circuit is energized so that hydraulic cylinder 125 is again energized to move the loader up until LS3 is again contacted, opening the circuit at P and de-energizing 2CR to stop further movement of the slide 121.

The transfer mechanism and loader are now back at their initial positions and the jaws 80, 81 have a blade inserted therebetween.

As slide 121 moves up from its intermediate position, milling heads 1 and 2 start to move down, that is, slides 170 and 170′ move out radially from the turret. Referring to circuit "Head 1 Down" and "Head 2 Down." Since a blade is in position, relay 15LSCR is energized and contact 15LSCR at Q and R are closed completing circuit through 7CR and 10CR, since 5LSCR and 11LSCR are also closed at this time. Interlocks 7CR and 10CR provide a holding circuit. This closes the contacts 7CR and 10CR in the solenoid circuits to control hydraulically operated cylinders 235 and 235′ in engagement with slides 170 and 170′ to move them to permit heads 1 and 2 to move down. These two solenoids are spring offset so that as soon as the solenoids are de-energized the flow of oil is reversed causing the heads to move up. One of the reasons for this is to insure movement of the milling heads upwardly if a power failure occurs.

When the slides 170 and 170′ move away from the center of the turret, with the heads down and to the right looking out radially, switches LS8 and LS14 are closed momentarily. Referring to the circuits "Head 1 Left" and "Head 2 Left," it will be seen that all of the other contacts in series with LS8 and LS14 are closed. This energizes relays 8CR and 11CR placing an interlock around LS8 and 5LSCR, LS14 and 11LSCR. In the solenoid circuits 8CR and 11CR contacts are closed energizing the solenoids which control the action of slides 168 and 168′ through their respective hydraulically operated pistons 180 and 180′. At the end of the stroke of slides 168 and 168′ limit switches LS6 and LS12 are opened. This opens the contacts in the circuits of relays 7CR and 10CR de-energizing the solenoids in the solenoid circuits for "Head 1 Down" and "Head 2 Down." Since the solenoids are spring offset, the heads move up rapidly. Reference is made to FIGURE 21a and cylinder 235 which controls the upward independent movement of the heads.

Switches LS6 and LS12 (see S and T) are double contact switches and with the slides in their right hand positions looking out radially, these switches are now closed at S and T. With the milling heads up, switches LS7 and LS13 are also closed energizing their respective relays. This closes contacts 7LSCR and 13LSCR in the circuits of relays 9CR and 12CR in the "Head 1 Right" and the "Head 2 Right" circuits energizing relays 9CR and 12CR. Contacts 9CR at U and 12CR at V are opened de-energizing relays 8CR and 11CR. Interlocks 9CR and 12CR in these circuits are also closed. At this point the slides 168 and 168′ start to move to the left and the milling heads to the right looking out radially from the turret. With the milling heads up, indexing now takes place.

Since LS3 is closed relay 3LSCR is energized and contact 3LSCR in the "Pin Out" circuit is closed. Switches 7LSCR and 13LSCR are also closed as are contacts 9CR and 12CR. Contach 15CR is used for set up purposes to relay the proper sequence of operations. Since the indexing pin is in, LS10 is closed. This energizes relay 5CR closing contact 5CR in the solenoid valve circuit to cause operation of cylinder 248 to pull the slide 244 and pin 242 out. When the pin is fully out LS10 is opened dropping out the circuit through relay 5CR. Switch LS10 is a double contact switch and when the contact LS10 in the "Pin Out" circuit is opened, contact LS10 at X is closed, closing a circuit through relay CR1; 7CR and 11CR being closed.

This causes the clutch shown schematically at Z to be energized causing the indexing to take place, CR1 at 2′ being closed. During rotation of the shaft in which the indexing cams are mounted, cam 256 causes LS19 at BB to close holding it closed and the other pole LS19 at CC in the "Start Position Index" circuit to open. This results in a circuit parallel to the one through relay 9LSCR holding the clutch in contact. During turning of the shaft 255, LS18 drops into the groove on the cam closing the circuit momentarily at DD through 5CR, 1CR and 6CR energizing relay 6CR. Interlock 6CR at EE bridges LS18. Switch 6CR at FF then opens. When LS19 drops into the low point of its cam it opens up the circuit and de-energizes the clutch drive stopping the indexing motion.

Switch 19LSCR at GG is closed as soon as switch LS19, the other pole at CC, is closed and the pin moves in when relay 13CR is energized. When the pin has moved in, switch LS9 is closed and 9LSCR is energized. Switch 9LSCR at HH drops out deenergizing 6CR and 13CR. This completes the cycle and prepares the apparatus for a repeat.

In case a blade is put in backwards in the chute, the dog 117 on transfer slide 56 will contact switch LS16 before the blade contacts LS15. This closes the circuit through relay JCR in the "Jam" circuit, opening the contact JCR at KK preventing relays 2CR, 3CR, 4CR and 15CR from being energized and thus preventing transfer and loading.

Having thus described the invention, what is claimed is:

1. Apparatus for loading a work positioning carrier, including a loading station, a loading mechanism adjacent said loading station and including a first slide member movable in one direction, a second slide on said first slide and movable transversely thereof, a cradle mounted on the second slide including spaced oppositely disposed pivoted arms for engaging a work piece in loading position and transferring said work piece from said loading position to said carrier, a movable work positioning carrier mounted adjacent said loading position and loading mechanism, and a clamping device for engaging and holding a work piece and mounted on said movable work positioning carrier, a cam mounted on said apparatus, a cam follower on said second slide adapted to engage said cam for causing movement of said second slide and said cradle on said loading device to automatically release said work piece when said clamping device engages said work piece.

2. Apparatus for loading a work positioning carrier, including a loading chute for receiving work pieces, a transfer mechanism adjacent said chute including a slide member, means on said slide member for releasably engaging a work piece, said slide member being movable between a work piece engaging position to a loading position, a loading mechanism adjacent said chute and said transfer mechanism and including a second slide normally of the movement of the transfer mechanism slide member, a third slide on said second slide and movable transversely thereof, a work engaging device mounted on said third slide for engaging a work piece in loading position and for transferring said work piece from said loading position to a carrier, a movable work positioning carrier mounted adjacent said chute, transfer mechanism and loading mechanism, a clamping device for engaging and holding a work piece and mounted on said movable work positioning carrier, a cam mounted on said apparatus, a cam follower mounted on said third slide and adapted to engage said cam on movement of said second slide toward said carrier for causing movement of said third slide and said work engaging device to automatically release said work piece when said clamping device engages said work piece.

3. Apparatus for loading a work positioning carrier, including a loading mechanism for delivering a work piece to a loading position, loading mechanism adjacent said loading mechanism and including a first slide member movable in one direction, a second slide on said first slide and movable transversely of said one position, a cradle mounted on said second slide including spaced oppositely disposed pivoted arms for engaging a work piece in loading position and for transferring said work piece from said loading position to a carrier, a movable work positioning carrier mounted adjacent said loading mechanism, a clamping device for engaging and holding a work piece and mounted on said movable work positioning carrier, a cam on said apparatus, a follower on said second slide for engaging said cam on movement of said first slide toward said carrier for causing movement of said second slide and said cradle away from said carrier for automatically releasing a work piece engaged by said clamping device when said clamping device moves to work piece engaging position.

4. Apparatus for loading elongated dependent work pieces on a work positioning carrier, including an elongated loading chute for receiving said work pieces, a transfer mechanism adjacent said chute including a slide member, pivoted work piece engaging fingers on said slide member longitudinally spaced along said chute and biased to a position normal to the movement of said slide member for engaging and moving said work pieces to a loading position, said slide member being movable between a work piece engaging position and a loading position, means on said slide member for locking said fingers against rotation when moving a work piece to loading position but permitting rotation of said fingers when said slide member is moved into work engaging position, work holding means at said loading position at the end of said chute, a loading mechanism adjacent said chute and said transfer mechanism and including a slide member movable normally of the movement of the transfer mechanism slide member, a cradle mounted on the loading mechanism slide member including spaced oppositely disposed pivoted arms for engaging and removing a work piece from said holding means in loading position and moving said work piece to said carrier, said carrier being mounted adjacent said chute, transfer mechanism and loading mechanism, and a clamping device comprising relatively movable jaws for engaging and holding a work piece and mounted on said work positioning carrier and movable between open and work piece engaging position when a work piece is positioned by the said cradle between said jaws, said cradle on said loading device automatically releasing a work piece to said clamping device after said jaws move to work piece engaging position.

5. Apparatus for loading elongated dependent work pieces on a work positioning carrier, including an elongated loading chute for receiving said work pieces, a transfer mechanism adjacent said chute including a slide member, means on said slide member including pivoted fingers spaced longitudinally along said chute for engaging a work piece therebetween and moving said work piece along said chute, said slide member being movable between a work piece engaging position and a loading position, means on said slide member for locking said fingers against rotation when moving a work piece to loading position and permitting rotation when said slide is moved to work engaging position, work holding means at said loading position, a loading mechanism adjacent said chute and said transfer mechanism and including a slide member movable normally of the movement of the transfer mechanism slide member, a movable work positioning carrier mounted adjacent said chute, transfer mechanism and loading mechanism, a cradle mounted on the loading mechanism slide member including spaced oppositely disposed pivoted arms for engaging a work piece in loading position for removing said work piece from said holding means and moving said work piece to said carrier, and a clamping device including a pair of relatively movable jaws for engaging and holding a work piece and mounted on said movable work positioning carrier, said arms on said cradle being movable outwardly for automatically releasing a work piece to said clamping device when said cradle moves to said carrier and positions a work piece between the jaws of said clamping device and after said jaws move to clamping position.

6. Apparatus for loading a work positioning carrier, including an elongated loading chute having a slot for receiving elongated work pieces extending through said slot and having work holding means adjacent one end thereof, a transfer mechanism adjacent said chute including a slide member, pivoted work piece engaging fingers on said slide member longitudinally spaced along and below said chute and biased to a position normal to the movement of said slide member, said slide member being movable between a work piece engaging position and a loading position for moving a work piece along said chute, a work holding means at said loading position, means on said slide member for permitting rotation of said fingers when said slide member moves into work engaging position and locking said fingers against rotation when said slide member moves into loading position, a loading mechanism adjacent said chute and said transfer mechanism and including a slide member movable normally of the movement of the transfer mechanism slide member, a movable work positioning carrier mounted adjacent said chute, transfer mechanism and loading mechanism and having relatively movable clamping jaws for receiving a work piece, a cradle mounted on said loading mechanism slide member including spaced oppositely disposed pivoted arms for engaging a work piece in loading position for removing said work piece from said loading position to said carrier, said arms being free to pivot outwardly from a given position to engage a work piece in said work holding means and for releasing a work piece to said carrier but locked against inward pivotal movement when in said given position and control mechanism connected to said transfer mechanism, said loading mechanism and said carrier for causing said loading mechanism to move between said loading position and the carrier after a work piece has been moved to loading position.

7. Apparatus for loading a work positioning carrier, including an elongated loading chute for receiving work pieces, a transfer mechanism adjacent and movable along said chute including a slide member, means on said slide member having rotatable fingers thereon and spaced along said chute, for releasably engaging a work piece, said slide member being movable between a work piece engaging position and a loading position, means on said slide member for locking said fingers in a position normal to said chute when said slide member moves to loading position, but permitting rotation of said fingers when said slide member moves to work piece engaging position, a work holding means adjacent said loading position, a loading mechanism adjacent said chute and said transfer mechanism and including a slide member movable normally of the movement of the transfer mechanism slide member, a work engaging device mounted on the loading mechanism slide member having pivoted arms for engaging a work piece in said work holding means for removing said work piece from said work holding means to said carrier, a movable work positioning carrier mounted adjacent said chute, transfer mechanism and loading mechanism, and a clamping device including relatively movable jaws for engaging and holding a work piece and mounted on said movable work positioning carrier, said pivoted arms on said loading device automatically releasing a work piece to said device when said movable jaws move to work piece engaging position and said loading mechanism moves away from said carrier, fluid pressure operated devices connected to each of said slides and to said clamping device for operating said slides and said clamping device, a source of fluid pressure, connections between said source and said fluid pressure operated devices, electrically operated devices connected between said source of fluid pressure and said connections for controlling the fluid pressure to said fluid pressure operated devices, and switching means positioned adjacent said slides and connected to said electrically operated devices and controlled by movement of said slides for controlling said electrically operated devices.

8. Apparatus for loading a work piece positioning carrier, including a loading chute for receiving elongated depending work pieces, said chute having a work piece holding means adjacent one end thereof, a transfer mechanism adjacent said chute including a slide member, said slide member being movable between a work piece engaging position and a loading position, pivoted work piece engaging fingers on said slide member biased to a position normal to the movement of said slide member and longitudinally spaced along said chute for engaging and simultaneously moving a pair of adjacent work pieces along said chute to said work holding means, means for locking said fingers against rotation when said slide member moves to loading position but permitting rotation of said fingers to pass by said work pieces when said slide member moves to work piece engaging position, a loading mechanism adjacent said chute and said transfer mechanism and including a slide member movable normally of the movement of the transfer mechanism slide member, a cradle mounted on the loading mechanism slide member including spaced oppositely disposed pivoted arms for engaging a work piece in said holding means for removing a work piece from said holding means, said arms being movable outwardly to engage a work piece in said holding means and to release said work piece to the work positioning carrier.

9. Apparatus for loading a work piece positioning carrier, including an elongated loading chute for receiving work pieces, a work piece holding means adjacent one end of said chute, a transfer mechanism adjacent said chute including a slide member, means on said slide member including pivoted fingers and spaced along said chute for releasably engaging adjacent work pieces and moving said work pieces along said chute, said slide member being movable between a work piece engaging position and a loading position, said fingers being locked against rotation when said transfer mechanism slide member moves to loading position but being rotatable when said transfer mechanism slide member moves to work engaging position, a loading mechanism adjacent said chute and said transfer mechanism and including a slide member movable normally of the movement of the transfer mechanism slide member, a movable work piece positioning carrier mounted adjacent said chute, transfer mechanism and loading mechanism, a cradle mounted on the loading mechanism slide member including spaced oppositely disposed pivoted arms for engaging a work piece in said work piece holding means and for removing said work piece from said work piece holding means and carrying a work piece to said carrier, and a clamping device for engaging and holding a work piece and mounted on said movable work positioning carrier, said pivoted arms on said loading device being movable outwardly to engage a work piece in said holding means and to release a work piece to said clamping device when said clamping device moves to work piece engaging position, fluid pressure operated devices connected to each of said slide members and to said clamping device for operating said slides and said clamping device, a source of fluid pressure, connections between said source and said fluid pressure operated devices, electrically operated devices connected between said source of fluid pressure and said connections for controlling the fluid pressure to said fluid pressure operated devices, and switching means positioned adjacent said slide members and connected to said electrically operated devices and controlled by movement of said slide members for controlling said electrically operated devices.

References Cited in the file of this patent

UNITED STATES PATENTS

| | | |
|---|---|---|
| 1,309,785 | Taylor | July 15, 1919 |
| 2,176,251 | Duhan | Oct. 17, 1939 |
| 2,408,457 | Tripp | Oct. 1, 1946 |
| 2,585,466 | Kaserman | Feb. 5, 1952 |
| 2,665,013 | Socke | Jan. 5, 1954 |
| 2,665,832 | Bagby | Jan. 12, 1954 |
| 2,807,227 | Kerns | Sept. 24, 1957 |